(12) United States Patent
Donaldson et al.

(10) Patent No.: US 8,550,388 B2
(45) Date of Patent: Oct. 8, 2013

(54) DRIVE CIRCUIT WITH INTEGRATED POWER FACTOR CORRECTION FOR BLENDER/SHAVER MACHINE

(75) Inventors: Scott B. Donaldson, Blacksburg, VA (US); Ronald Flanary, Blacksburg, VA (US)

(73) Assignee: Moog Inc., East Aurora, NY (US)

(*) Notice: Subject to any disclaimer, the term of this patent is extended or adjusted under 35 U.S.C. 154(b) by 275 days.

(21) Appl. No.: 13/048,816

(22) Filed: Mar. 15, 2011

(65) Prior Publication Data
US 2012/0001002 A1 Jan. 5, 2012

(51) Int. Cl.
*B02C 23/00* (2006.01)
*B02C 25/00* (2006.01)

(52) U.S. Cl.
USPC .............................................. 241/36; 241/92

(58) Field of Classification Search
USPC .................. 241/33–37, 92, DIG. 17
See application file for complete search history.

(56) References Cited

U.S. PATENT DOCUMENTS

| | | | |
|---|---|---|---|
| 2,872,591 A | 2/1959 | Stineman | |
| 4,317,072 A | 2/1982 | Goof et al. | |
| 4,467,258 A | 8/1984 | Leuthen | |
| 5,428,283 A | 6/1995 | Kalman et al. | |
| 5,532,917 A | 7/1996 | Hung | |
| 5,561,356 A | 10/1996 | Nanos | |
| 5,583,423 A | 12/1996 | Bangerter | |
| 5,602,465 A | 2/1997 | Clemente | |
| 5,737,209 A | 4/1998 | Stevens | |
| 5,909,361 A | 6/1999 | Kim | |
| 6,061,253 A | 5/2000 | Igarashi et al. | |
| 6,095,677 A | 8/2000 | Karkos, Jr. et al. | |
| 6,164,575 A | 12/2000 | Karkos, Jr. | |
| 6,220,047 B1 | 4/2001 | Vogel et al. | |
| 6,237,698 B1 | 5/2001 | Carrier et al. | |
| 6,325,312 B1 * | 12/2001 | Karkos, Jr. ................ 241/100 |
| 6,336,603 B1 | 1/2002 | Karkos, Jr. et al. | |
| 6,493,643 B1 | 12/2002 | Aisa | |
| 6,619,304 B2 | 9/2003 | Worm | |
| 6,712,497 B2 | 3/2004 | Jersey et al. | |
| 6,899,454 B2 | 5/2005 | Terentiev | |
| 6,903,536 B2 | 6/2005 | Yang | |
| 6,941,724 B2 | 9/2005 | Arrant et al. | |

(Continued)

FOREIGN PATENT DOCUMENTS

EP 1249067 7/2005

OTHER PUBLICATIONS

International Energy Agency; "Innovative Electrical Concepts Photovoltaic Power Systems Programme;" Report IEA—PVPS T7-7:2001; pp. 1-19; Austria/Switzerland.

(Continued)

*Primary Examiner* — Faye Francis
(74) *Attorney, Agent, or Firm* — Hodgson Russ LLP

(57) ABSTRACT

Embodiments of the invention provide a machine that blends liquids and/or shaves ice. The machine includes a motor and a control system with an integrated power factor correction circuit and a drive circuit. The integrated power factor correction circuit receives input power from a mains power line, reduces noise transmitted to the mains power line, and provides a boosted, regulated output voltage. The drive circuit is connected to the motor and uses the regulated output voltage in order to control an effective voltage applied to the motor substantially independent of the voltage and frequency of the input power.

17 Claims, 24 Drawing Sheets

(56) References Cited

U.S. PATENT DOCUMENTS

| | | |
|---|---|---|
| 7,019,498 B2 | 3/2006 | Pippin et al. |
| 7,023,163 B2 | 4/2006 | Charles et al. |
| 7,086,778 B2 | 8/2006 | Terentiev |
| 7,267,479 B2 | 9/2007 | Terentiev |
| 7,420,351 B2 | 9/2008 | Grbovic |
| 7,633,782 B1 | 12/2009 | Herbert |
| 7,638,966 B1 | 12/2009 | Pummer |
| 2002/0079393 A1 | 6/2002 | Karkos, Jr. et al. |
| 2002/0092802 A1 | 7/2002 | Evana, III et al. |
| 2003/0047202 A1 | 3/2003 | Worm |
| 2003/0080644 A1 | 5/2003 | Nelson et al. |
| 2004/0021020 A1* | 2/2004 | Rupp .................. 241/92 |
| 2006/0210412 A1 | 9/2006 | Lawyer et al. |
| 2006/0243838 A1* | 11/2006 | Nakato ................ 241/84 |
| 2007/0030759 A1 | 2/2007 | Terentiev |
| 2007/0221068 A1 | 9/2007 | Boussemart et al. |
| 2008/0156913 A1* | 7/2008 | Orent .................. 241/37.5 |
| 2008/0205103 A1 | 8/2008 | Sutardja et al. |
| 2008/0225636 A1* | 9/2008 | Kolar .................. 366/206 |
| 2010/0052601 A1 | 3/2010 | Pummer |
| 2010/0264747 A1* | 10/2010 | Hall et al. .......... 307/104 |

OTHER PUBLICATIONS

R. Brown & M. Soldano, PFC Converter Design with IR1150 One Cycle Control IC, International Rectifier Application Note, Jun. 2005, 1-18, AN-1077, Rev.2.3, International Rectifier.

SB2000 Island Oasis Service Manual: The World's Finest Frozen Drink, prior to Mar. 15, 2010, 1-46, Island Oasis Frozen Beverage Co., Walpole, MA.

* cited by examiner

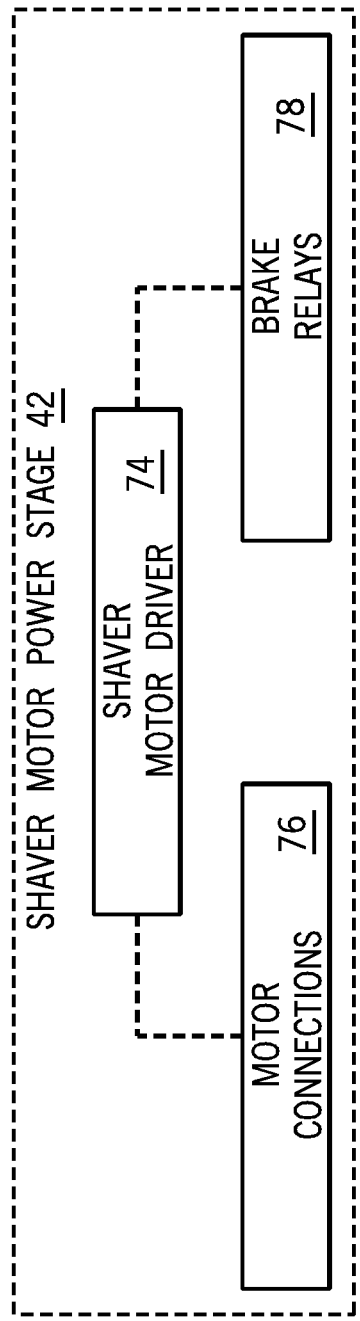

DRIVE CIRCUIT WITH INTEGRATED POWER FACTOR CORRECTION FOR BLENDER/SHAVER MACHINE

RELATED APPLICATIONS

This application claims priority under 35 U.S.C. §119 to U.S. Provisional Patent Application No. 61/314,093 filed on Mar. 15, 2010, the entire contents of which is incorporated herein by reference.

BACKGROUND

Conventional blenders incorporate a mechanically-driven impeller rotatably mounted within a removable blender cup. Many blenders have the drive motor mounted in the base under the cup or off to the side of the cup.

Blenders can be combined with ice shavers in a single unit, for example, for use in restaurants or bars to produce frozen drinks. DC brushless motors can be used for blender/shaver machines. These motors use a comparatively heavy rotor formed of a sector-like array of permanent magnets. Blending of a mass of shaved or cubed ice and liquid, particularly on start up or during a "freeze up" of a frozen drink, requires a comparatively high torque.

The power factor of an AC electric power system is defined as the ratio of the real power flowing to the load (e.g., a motor) to the apparent power, and is a dimensionless number between 0 and 1 (frequently expressed as a percentage, e.g. 0.5 pf=50% pt). Real power is the capacity of the circuit for performing work in a particular time. Apparent power is the product of the current and voltage of the circuit. Due to energy stored in the load and returned to the source, or due to a non-linear load that distorts the wave shape of the current drawn from the source, the apparent power can be greater than the real power. In an electric power system, a load with low power factor draws more current than a load with a high power factor for the same amount of useful power transferred. Thus, a circuit with a low power factor will use higher currents to transfer a given quantity of real power than a circuit with a high power factor.

Where reactive loads are present, such as with capacitors or inductors, energy storage in the loads result in a time difference between the current and voltage waveforms. During each cycle of the AC voltage, extra energy, in addition to any energy consumed in the load, is temporarily stored in the load in electric or magnetic fields, and then returned to the power grid a fraction of a second later in the cycle. The "ebb and flow" of this nonproductive power increases the current in the line and creates electrical noise in the power grid. Inductive loads such as motors (or any type of wound coil) consume reactive power with the current waveform lagging the voltage. Inductive loads will absorb energy during part of the AC cycle, which is stored in the device's magnetic or electric field, only to return this energy back to the power grid during the remainder of the cycle, which can create electrical noise.

SUMMARY

Some embodiments of the invention provide a machine that blends liquids and/or shaves ice. The machine includes a motor that operates an impeller for blending liquid and/or shaving ice and a control system that controls the motor. The control system is adapted to be connected to a mains power line and to receive inputs from a switch interface. The control system includes an integrated power factor correction circuit and a drive circuit. The integrated power factor correction circuit receives input power from the mains power line, reduces noise transmitted to the mains power line, and provides a boosted, regulated output voltage for use with the control system. The drive circuit is connected to the motor and uses the regulated output voltage in order to control an effective voltage applied to the motor based on the inputs from the switch interface substantially independent of the voltage and frequency of the input power from the mains power line.

Some embodiments of the invention provide a blender including a motor that operates an impeller and a control system that controls the motor. The control system is adapted to receive an input power and includes an integrated power factor correction circuit and a microcontroller. The integrated power factor correction circuit receives and regulates the input power, and provides a regulated output voltage for use with the motor. The microcontroller is in communication with the integrated power factor correction circuit, and the motor and is capable of detecting a high load condition on the motor. The microcontroller modulates the regulated output voltage from the integrated power factor correction circuit to provide a temporary burst of power in order to overdrive the motor and overcome the high load condition.

Some embodiments of the invention provide a method for controlling a motor in a blender. The method includes receiving power from a mains power line and then boosting and regulating the received power using a power factor correction circuit in order to provide input power to the motor. The method also includes monitoring the speed of the motor, determining a high load condition on the motor based on the monitored speed, and providing a temporary increased input power to the motor in order to overdrive the motor and overcome the high load condition.

DESCRIPTION OF THE DRAWINGS

FIG. 6A is a block diagram of a shaver motor power stage according to one embodiment of the invention.

FIGS. 6B-1 and 6B-2 are electrical schematics of a shaver motor driver of the shaver motor power stage of FIG. 6A.

FIGS. 7B-1 and 7B-2 are electrical schematics of a blender motor driver of the blender motor power stage of FIG. 7A.

DETAILED DESCRIPTION

Figure 1:
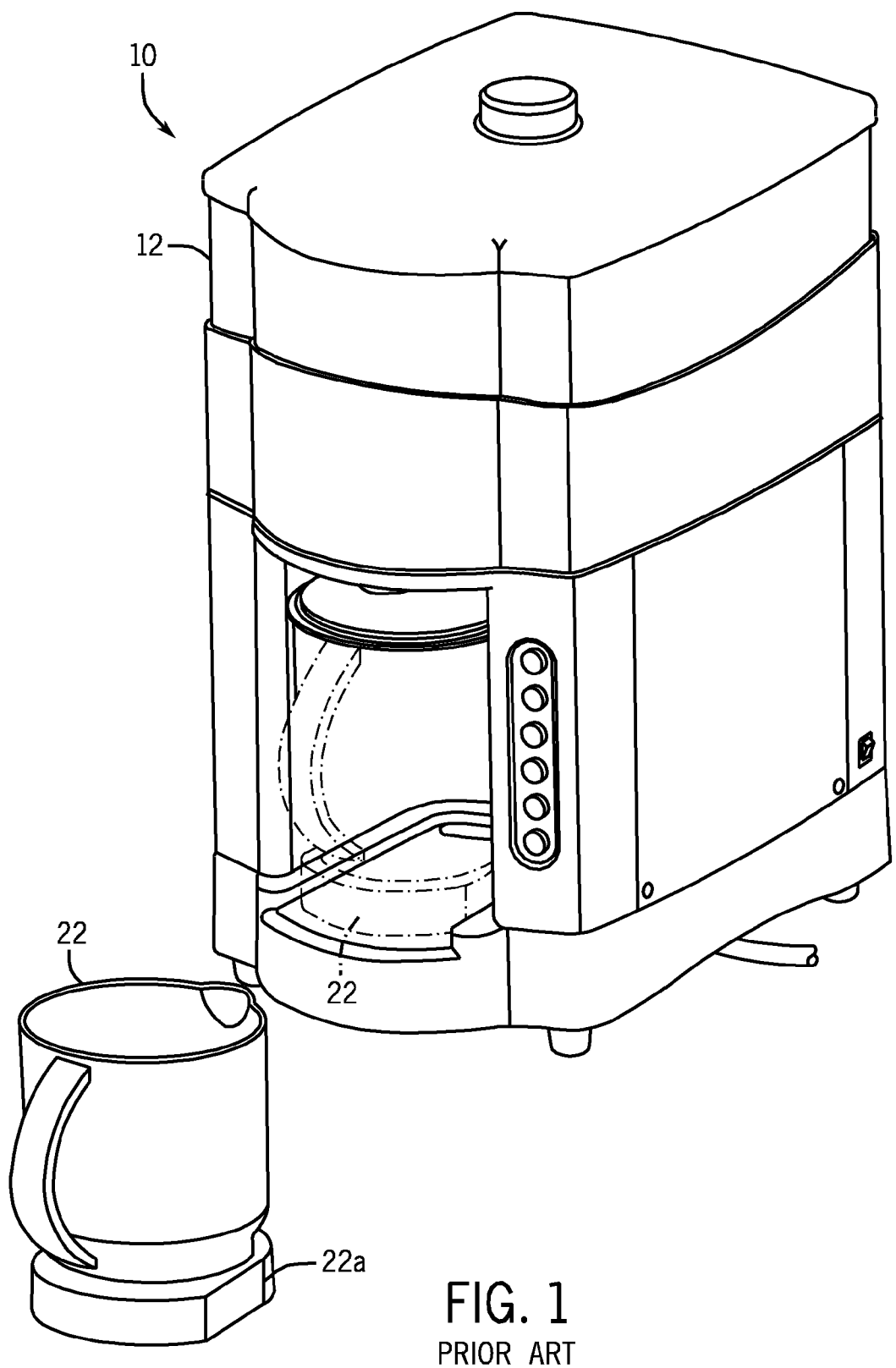
FIG. 1 is a perspective view of a prior art blender/shaver machine for use with an integrated power factor correction (PFC) circuit according to one embodiment of the invention.

Before any embodiments of the invention are explained in detail, it is to be understood that the invention is not limited in its application to the details of construction and the arrangement of components set forth in the following description or illustrated in the following drawings. The invention is capable of other embodiments and of being practiced or of being carried out in various ways. Also, it is to be understood that the phraseology and terminology used herein is for the purpose of description and should not be regarded as limiting. The use of "including," "comprising," or "having" and variations thereof herein is meant to encompass the items listed thereafter and equivalents thereof as well as additional items. Unless specified or limited otherwise, the terms "mounted," "connected," "supported," and "coupled" and variations thereof are used broadly and encompass both direct and indirect mountings, connections, supports, and couplings. Further, "connected" and "coupled" are not restricted to physical or mechanical connections or couplings.

The following discussion is presented to enable a person skilled in the art to make and use embodiments of the invention. Various modifications to the illustrated embodiments will be readily apparent to those skilled in the art, and the generic principles herein can be applied to other embodiments and applications without departing from embodiments of the invention. Thus, embodiments of the invention are not intended to be limited to embodiments shown, but are to be accorded the widest scope consistent with the principles and features disclosed herein. The following detailed description is to be read with reference to the figures, in which like elements in different figures have like reference numerals. The figures, which are not necessarily to scale, depict selected embodiments and are not intended to limit the scope of embodiments of the invention. Skilled artisans will recognize the examples provided herein have many useful alternatives and fall within the scope of embodiments of the invention.

In general, embodiments of the invention relate to a drive circuit for a magnetic drive to transmit rotational motion from a motive source into an enclosed space without a direct mechanical connection. More specifically, it relates to blenders, ice shavers, mixers, and to devices having a stirrer, impeller, blade, or other tool mounted within a removable cup or container, and rotated by means of a motor located in the stationary base of the machine.

Blender/shaver machines used in the United States generally operate on 120 volt, alternating current (VAC) line voltage only. In order to sell a blender/shaver machine worldwide, it is necessary to comply with European and international safety and electrical standards. One specification becoming more important in the United States and internationally is the local operating network (LON) specification, which requires that electrical noise put onto a power line be minimized. The purpose of LON is to enable a company to establish an internal communication network amongst equipment via the power grid inside a building. To accomplish this, electrical noise must be kept to a very low level. In order to meet requirements for line harmonics and allow the machine to operate on any voltage from 100 to 250 VAC, a power factor correction circuit (PFC) can be incorporated into the motor control circuit according to embodiments of the invention, as described below.

Figure 2:
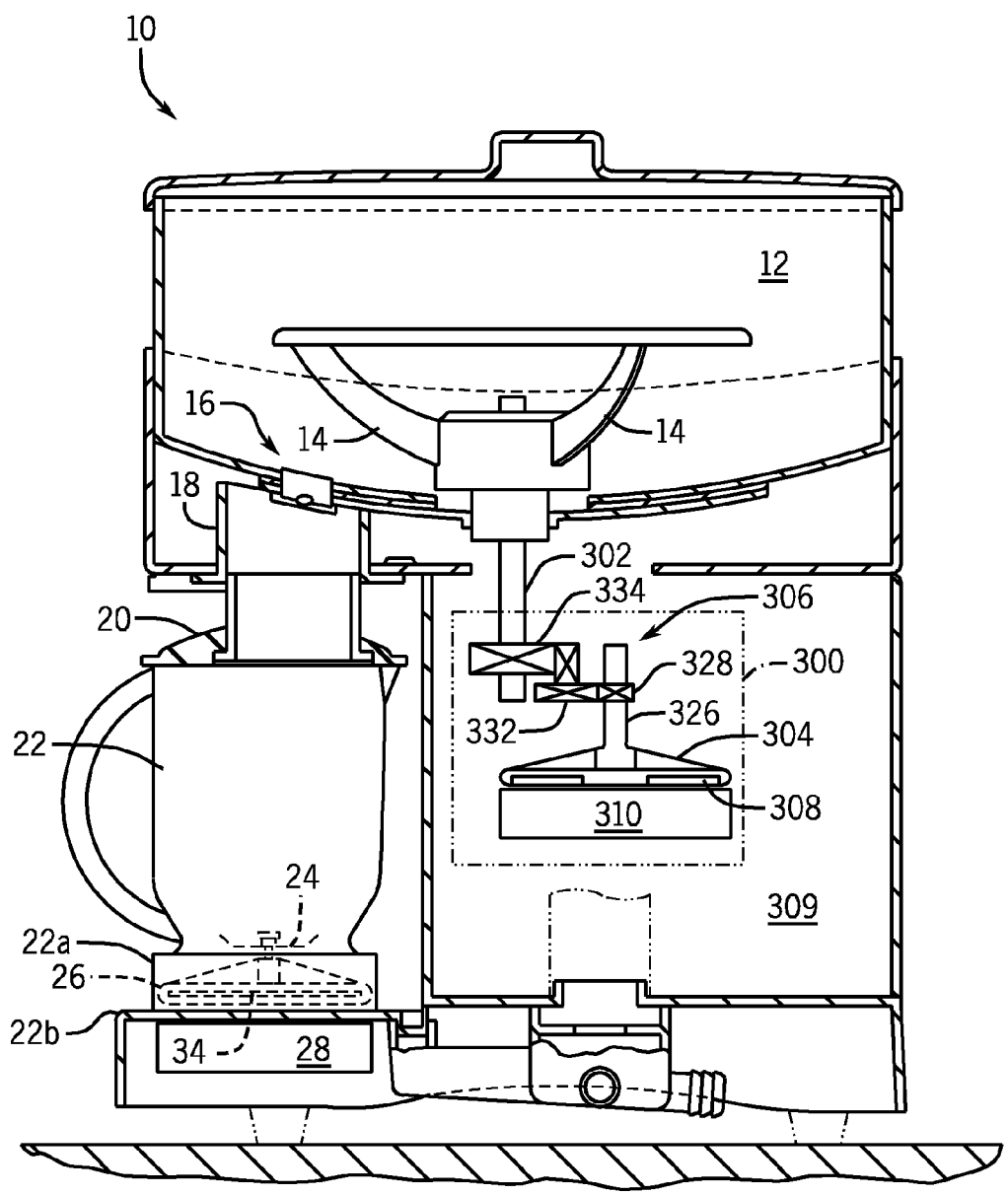
FIG. 2 is a cross-sectional view of the prior art blender/shaver machine of FIG. 1.

FIGS. 1 and 2 illustrate a blender/shaver machine 10 for use with an integrated power factor correction (PFC) circuit according to one embodiment of the invention. The blender/shaver 10 can be used for the automatic manufacture of frozen drinks in bars and restaurants. A supply of ice held in a hopper 12 is fed by a rotating set of blades 14 to a blade ice/shaver 16. The shaved ice falls through a chute 18 including a lid 20 into a blender cup 22 to which liquid ingredients such as a flavor concentrate and/or spirit have been added. Rotation of an impeller (or blade set) 24 at the bottom of the cup 22 for a preset period of time produces a frozen drink. While the invention will be described for use in the blender/shaver 10, the invention can be used in a wide variety of applications where it is desired to transmit power from a rotary output of a motive source (e.g., a motor) to a driven member under a load, particularly a rotating driven member held in a container that is sealed from and removable from the motive source. The invention can be used, for example, in a variety of food processing equipment such as home blenders, food mixers, food processors, and juicers.

As shown in FIG. 2, a magnetic drive 26 for the impeller 24 can include a generally circular drive plate 34 rotatably mounted in a base 22a of the blender cup 22, and a brushless DC motor 28 including stator coils and a rotor. The rotor can include a double magnet assembly formed of a rotor ring magnet, a drive ring magnet, and a disc of a magnetizable material (e.g., cold-rolled steel) bonded between the magnets.

The position of the rotor can be sensed by three conventional Hall effect sensors, as described below, mounted in the motor housing or the base. Position signals provide input to an electronic control and drive circuit that energizes the three phase stator windings to produce a start-up torque, a ramp up of the rotor speed of rotation to a selected operating speed, a maintained rotation at that selected speed under load, and then a rapid and reliable braking. Operation of the motor can be electronically controlled and programmable, as described below. To optimize the performance of the motor 28, the stator coils can be wound to optimize the torque output at a preselected operating speed (e.g., near 10,000 RPM).

FIG. 2 also illustrates an ice shaver assembly for supplying shaved ice to the blender of the blender/shaver machine 10. The ice shaver assembly includes a magnetic drive and gear assembly 300 that operates to rotate blades 14 to supply shaved ice to the blender cup 22 through the chute 18. The magnetic drive and gear assembly 300 is coupled to an output shaft 302 that is connected at its upper end to the rotating set of blades 14. The magnetic drive and gear assembly 300 includes a magnetic drive 304 that is analogous in structure and operation to the magnetic drive 26 of the blender. The output of the magnetic drive 304 is transmitted through a gear assembly 306 to the output shaft 302 of the shaver. The gear assembly includes three gears, namely, a motor gear 328, a compound idler gear 332, and an output gear 334. In some embodiments, the ice shaver assembly and/or the blender assembly can include a direct drive assembly in place of the gear assembly.

The magnetic drive 304 for the shaver includes a generally circular drive plate 308 rotatably mounted in the motor housing 309 of the ice shaver assembly and a brushless DC motor 310 including stator coils and a rotor. The rotor can include a double magnetic assembly formed of a rotor ring magnetic, a drive ring magnetic, and a disk of a magnetizable material (e.g., cold-rolled steel) bonded between the magnets.

The brushless DC motor 310 can be mounted in the motor housing 309 beneath the rotor. The motor 310 can be constructed and can operate in a manner analogous to the motor 28 of the magnetic drive 26 of the blender described above. The stator coils can be three phase coils being energized by a brushless DC motor drive circuit, as described below, to produce a rotating electromagnetic field. The rotor can include a shaft secured at its center to slide axially into a bearing. The DC magnetic field produced principally by the lower rotor ring magnet can be directed principally downward to interact with the rotating electromagnetic field produced by the stator coils when the coils are energized. Rotation of this electromagnetic field interacting the rotor magnetic assembly produces a torque that rotates the rotor at a like rotational speed. The disk can be bonded between the magnets and can transmit this torque to the drive ring magnet.

As in the case of the rotor of the magnetic drive 26 of the blender, described above, the position of the motor 310 can be sensed by three Hall effect sensors mounted in the motor housing 309. Position signals provide input to an electronic control and drive circuit, further described below, that energizes the three phase stator windings to produce a startup torque, a ramp up of the rotor speed of rotation to a selected operating speed, a maintained rotation at that selected speed under load, and a rapid and reliable braking torque. As in the case of the motor 28 described above, operation of the motor 310 can be electronic and programmable. In addition, braking for either motor 28, 310 can be controlled electronically (e.g., dynamic braking).

In one embodiment of the ice shaver, the desired speed of an output shaft 326 of the ice shaver is approximately 540 RPM for effective operation of the ice shaver. The magnetic drive 300, employing a brushless DC motor, typically generates an operational speed of approximately 9000 RPM to 10,000 RPM. Accordingly, the gear ratio of the gear assembly 306 may be approximately 11.1:1. In some embodiments, for example during use of the direct drive assembly controlling the shaver motor 28 and/or the blender motor 310, the blender and/or shaver blades can rotate at about 1000 RPM.

One skilled in the art will readily appreciate that a control system/drive circuit of the invention can be used in a wide variety of applications, in addition to the ice shaver described above, where it is desired to transmit power from a rotary output of a motor to a driven member under a load, including in other food processing equipment such as blenders, food mixers, food processors, and juicers. Additionally, although the invention is described as a combination blender/ice shaver machine, one skilled in the art will readily appreciate that the ice shaver can be a stand alone unit (i.e., the ice shaver can be independent of the blender) or the blender can be a stand alone unit.

The control system of the invention, including the PFC circuit, can be designed for domestic and international use so that the blender/shaver machine 10 can operate over a wide operating range of input voltages and frequencies without degrading the overall unit performance. The PFC circuit can also help to ensure both a good line power factor and low emissions. In addition, the PFC circuit can improve LON compliance. More specifically, the PFC circuit can reduce the harmonics that are transmitted back to the power line being used to power the blender/shaver machine 10, which can also enable Conformite Europiene (CE) compliance over a wide range of input voltages and frequencies. As a result, the integrated PFC circuit can help meet international specifications so that the blender/shaver machine can be used with an internal communication network via the power grid inside a building (e.g., a restaurant or bar).

In addition, the PFC circuit being integrated with the control system enables use of the same motor set regardless of, or substantially independent of, the input voltage and frequency, as further described below. For example, in one embodiment, a motor that is wound for 120 VAC can be used with the PFC circuit. The same motor can be used for the blender motor 28 and/or the shaver motor 310 and can operate with a US domestic power input (e.g., about 120 VAC) or an international power input (e.g., between about 100 VAC and about 250 VAC and between about 50 Hertz and about 60 Hertz).

The PFC circuit can act as a boost converter with a regulated output. As a result, the output has very little variation with line voltage, line frequency, line impedance, or load, allowing better motor speed regulation, more consistent cycle times, and higher drink quality. Due to the nature of a PFC circuit, the operating bus voltage (e.g., the output of the PFC circuit) can be fairly high, such as around 400 Volts, direct current (VDC) for a 230 VAC input (i.e., a mains voltage of about 230 VAC). By pulse width modulating the voltage applied to the motor 28, 310, the effective voltage actually applied to the motor 28, 310 can be determined. Using a motor wound for the domestic market (e.g., 120 VAC), the bus voltage associated with the PFC output (e.g., 400 VDC) can be pulse width modulated at or below 40% duty cycle to make the effective maximum applied voltage to the motor only 160 VDC, which would be the normal maximum voltage applied to the motor 28, 310 for a normal diode-rectified 120 VAC US domestic designed drive circuit.

In addition to meeting line harmonic requirements and allowing the machine to operate on worldwide line voltages and frequencies, the integrated PFC circuit can also improve the motor speed regulation, resulting in a more consistent product (i.e., drink quality). Conventional blenders or blender/shaver machines operate from an un-regulated 160 VDC supply derived from full-wave rectification of the 120 V, 60 Hertz AC power line. The unregulated 160 VDC supply varies with line voltage, line frequency, line impedance, and load. This results in variations in motor speed, cycle time, and drink quality.

The motors in a conventional 120 VAC machine are designed to operate from a 160 VDC supply. By operating the motor drivers a reduced pulse width modulation (PWM) duty cycle of 40%, the effective applied voltage to the motors can be reduced from 400 VDC to 160 VDC, allowing the use of the original 120 VAC motors.

In another embodiment, a motor that is wound for 160 VAC can be used with the PFC circuit for the blender motor 28 and/or the shaver motor 310 and can operate with the US domestic power input or the international power input. As a result, the motor can operate from the 400 VDC supply output from The PFC circuit without requiring pulse-width modulation to lower the effective voltage input to the motor (i.e., the motor drivers can be operated at 100% duty cycle). By using the 160 VAC motors instead of conventional 120 VAC motors, electromagnetic interference, noise sensitivity, and/or leakage currents can be reduced. For example, in some embodiments, blender/shaver machines 10 can include a dedicated US domestic model which uses a 160 VDC motor operating from a 120 VAC mains input (i.e., domestic mains input), and a universal international model which uses a 400 VDC motor operating from a mains input which can range between about 100 VAC and 250 VAC.

Figure 3:
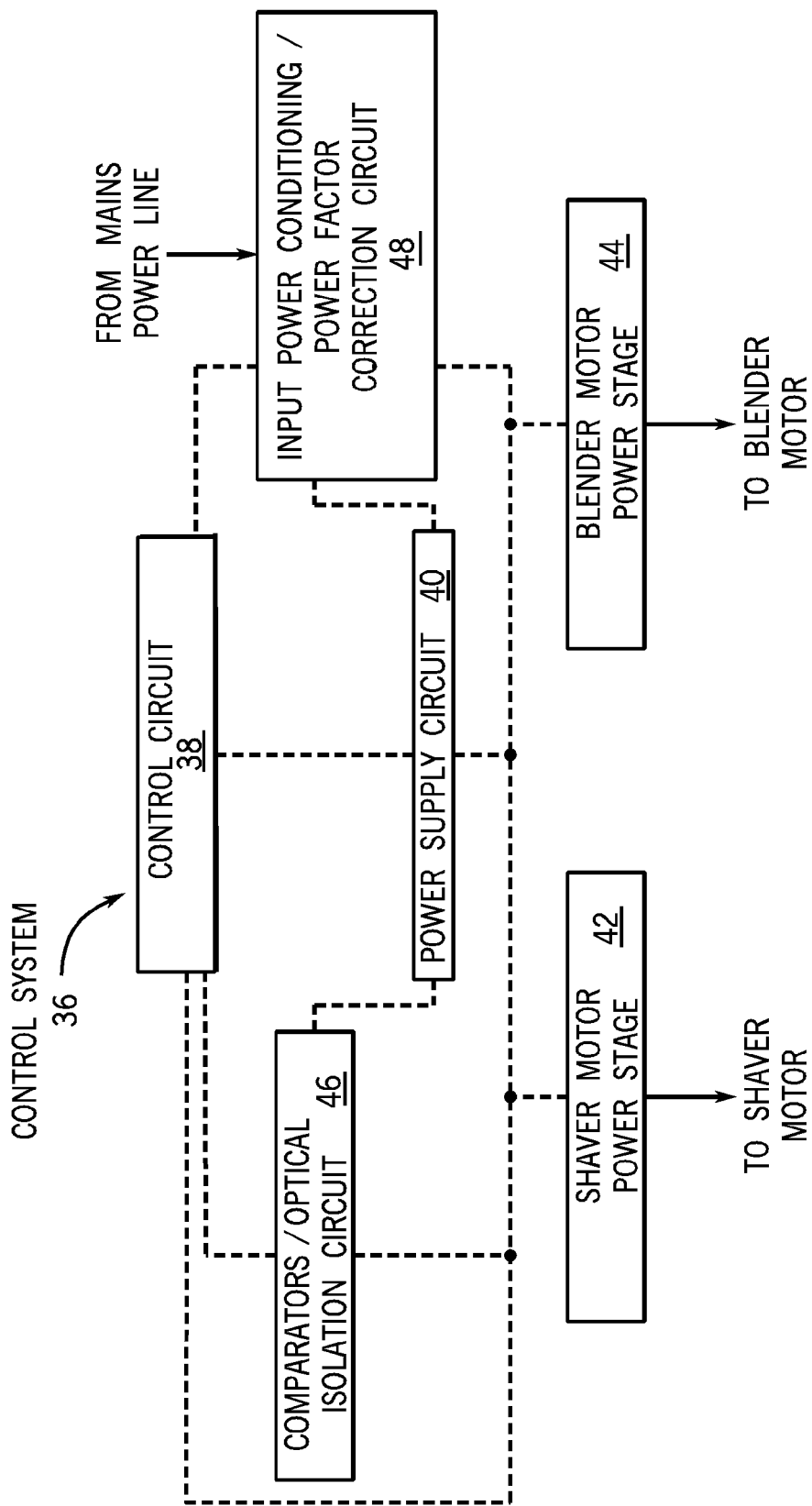
FIG. 3 is a block diagram of a control system for a blender/shaver machine according to one embodiment of the invention.

FIGS. 3-9B illustrate a control system 36 according to one embodiment of the invention for use with a blender/shaver machine 10. The control system 36 can control both the blender motor 28 and the shaver motor 310, as well as various other inputs and outputs (e.g., a cup sensor, a lid sensor, an LCD interface). As shown in FIG. 3, the control system 36 can include a control circuit 38, a power supply circuit 40, a shaver motor power stage 42, a blender motor power stage 44, comparators and optical isolation circuit 46, and an input power conditioning and PFC circuit 48.

Figure 4A:
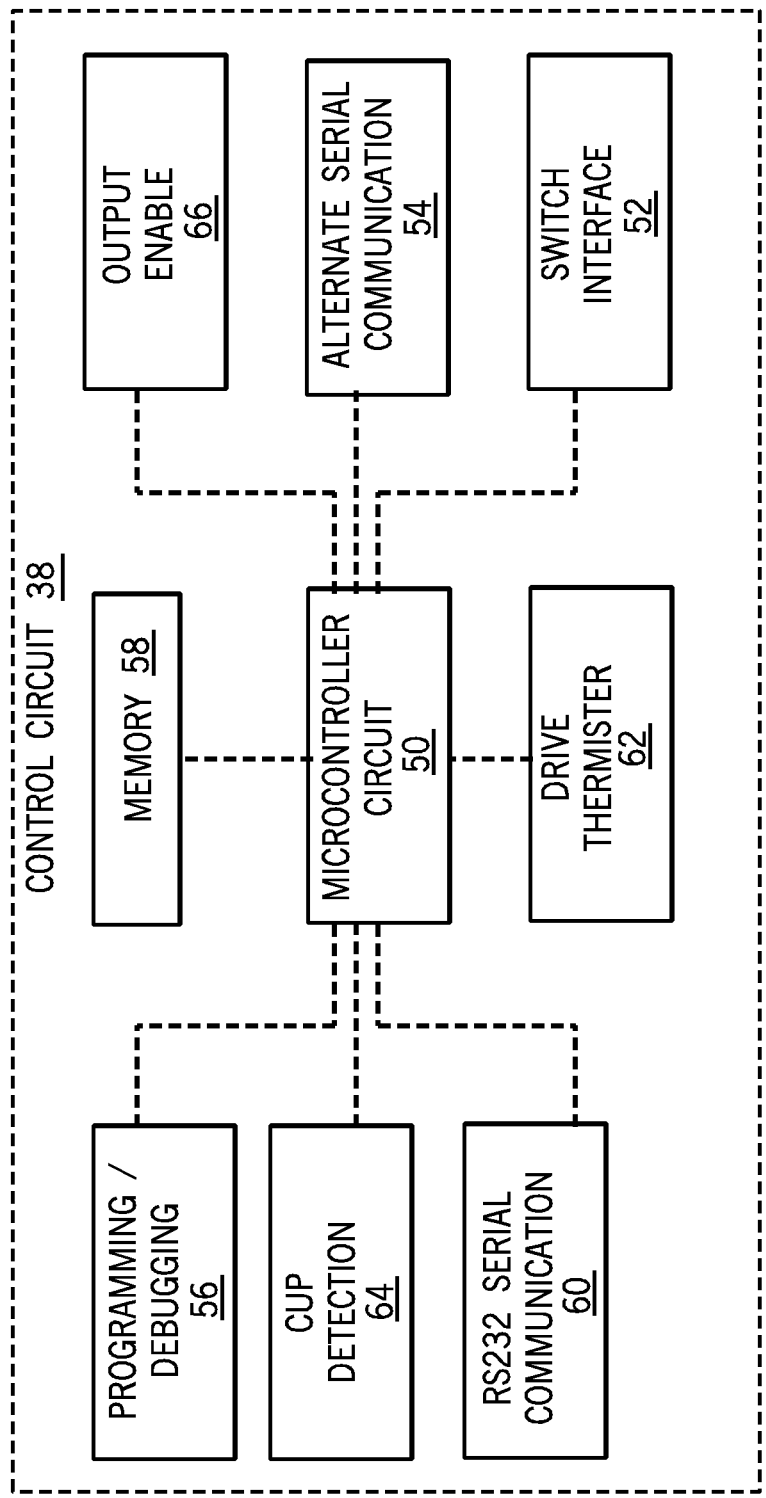
FIG. 4A is a block diagram of a control circuit according to one embodiment of the invention.

FIG. 4A illustrates the control circuit 38. The control circuit 38 can include a microcontroller circuit 50, a switch interface 52, an alternate serial communication 54, a programming/debugging interface 56, memory 58, serial communication interface 60, a drive thermistor circuit 62, a cup detection circuit 64, and an output enable circuit 66. The control circuit 38 can include a microcontroller UI, as shown in the microcontroller circuit 50 in FIG. 4B, and its inputs and outputs.

Figure 4B:
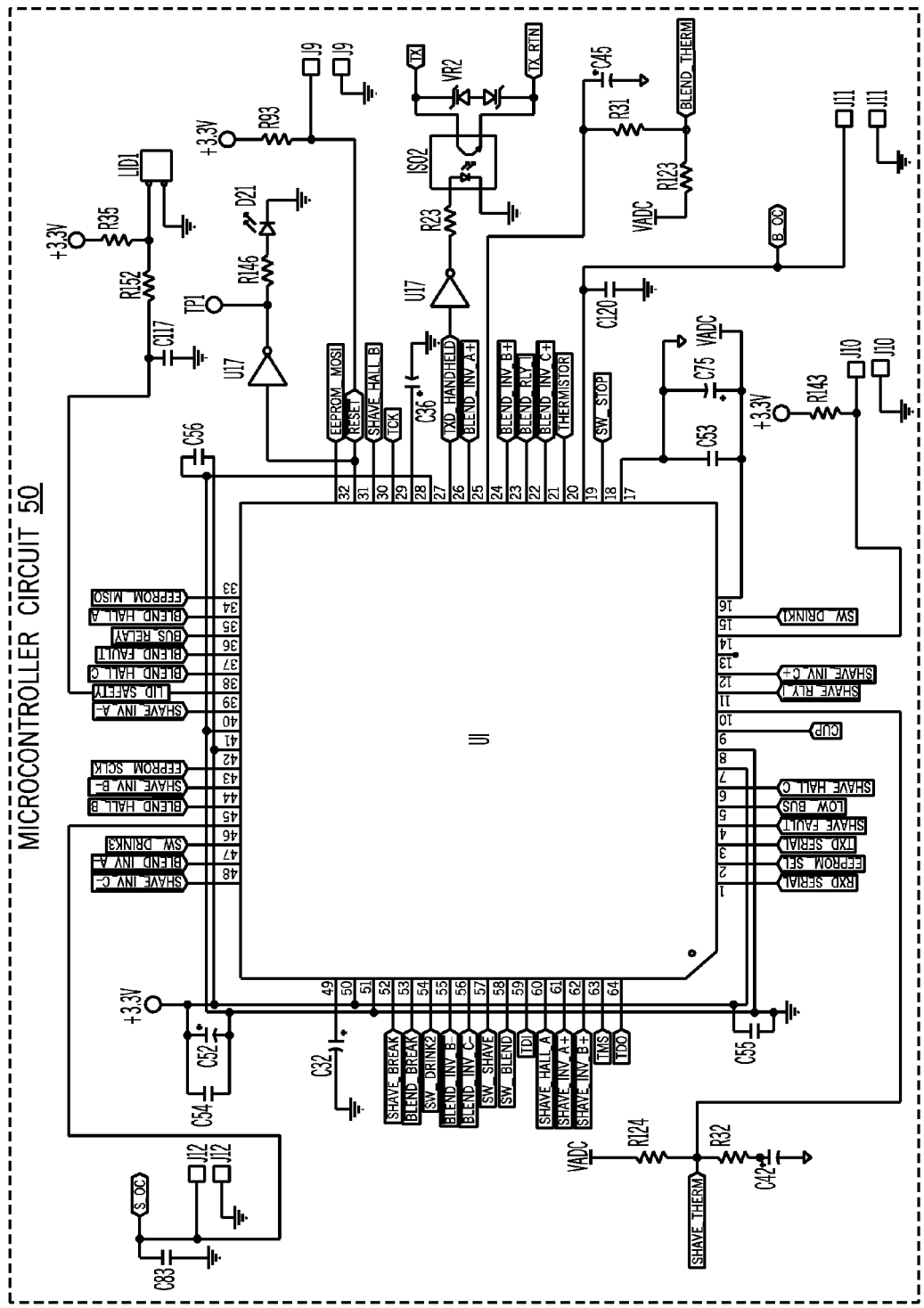
FIG. 4B is an electrical schematic of a microcontroller circuit of the control circuit of FIG. 4A.

FIG. 4B illustrates the microcontroller circuit 50, including the microcontroller U1. The microcontroller U1 can be responsible for receiving commands, outputting status, operating the motors, and fault handling and recording. In addition, PWM control can be implemented in the software of the microcontroller UI on a motor control card. For example, in some embodiments, the microcontroller U1 can limit the maximum PWM duty cycle to 40% for each motor to allow the use of 160V motors from the 400V bus. In other embodiments, for example using a 240V motor receiving power from a 400V bus, the microcontroller U1 can PWM motor input during startup, and subsequently operate the motor at 100% duty cycle.

Figure 4C:
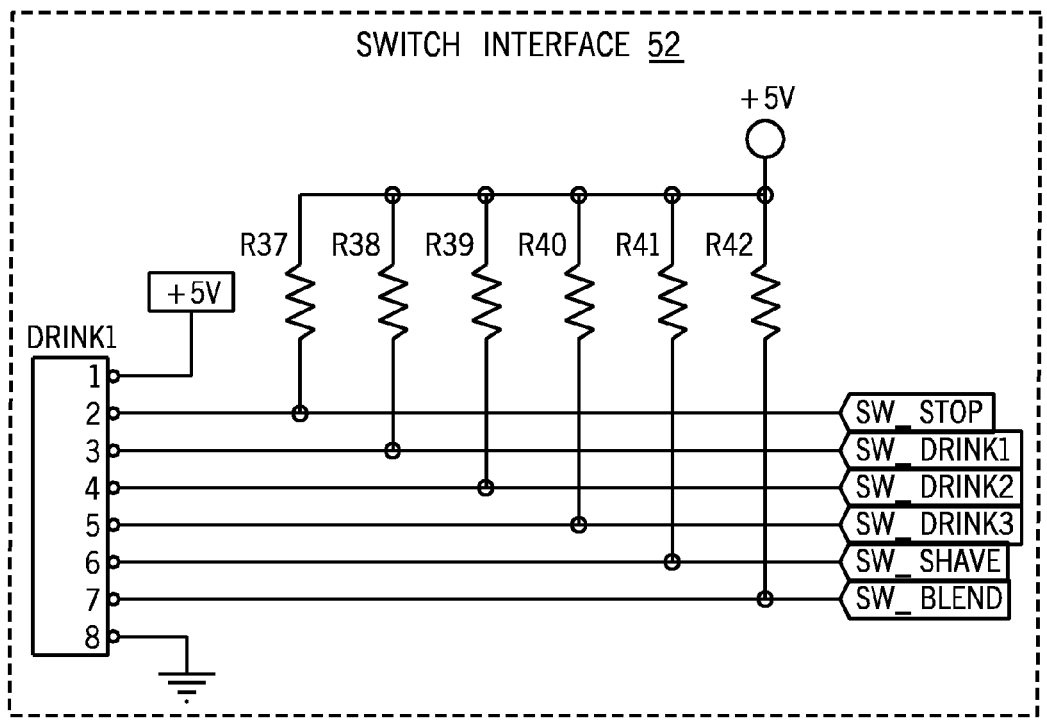
FIG. 4C is an electrical schematic of a switch interface of the control circuit of FIG. 4A.

Commands and/or status outputs can be communicated through a pushbutton/LED panel via a DRINK1 connector of the switch interface 52, as shown in FIG. 4C. For example, the following commands can be communicated from the pushbutton panel, through the switch interface 52, to the microcontroller U1: SW_STOP (stop blending/shaving) to pin 18 of the microcontroller U1, SW_DRINK1 (first blend/shave speed) to pin 15 of the microcontroller U1, SW_DRINK2 (second blend/shave speed) to pin 54 of the microcontroller U1, SW_DRINK3 (third blend/shave speed) to pin 46 of the microcontroller U1, SW_SHAVE (shave only) to pin 57 of the microcontroller U1, and SW_BLEND (blend only) to pin 58 of the microcontroller U1.

Figure 4D:
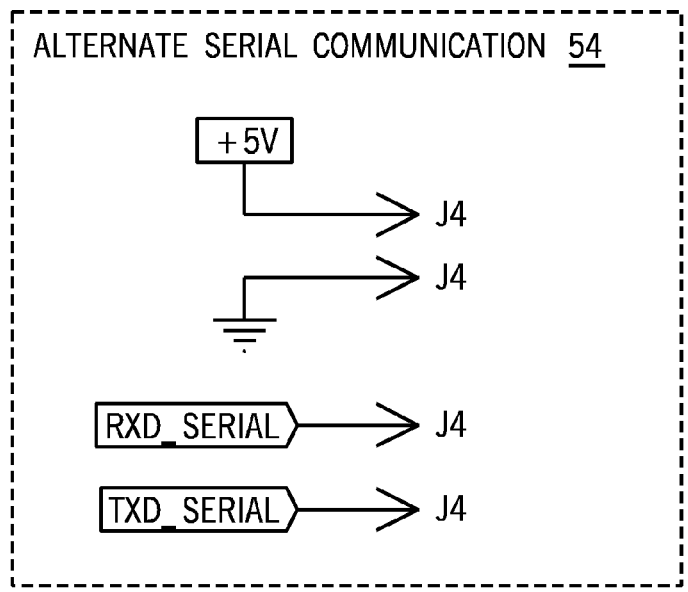
FIG. 4D is an electrical schematic of a serial communication circuit of the control circuit of FIG. 4A.
Figure 4E:
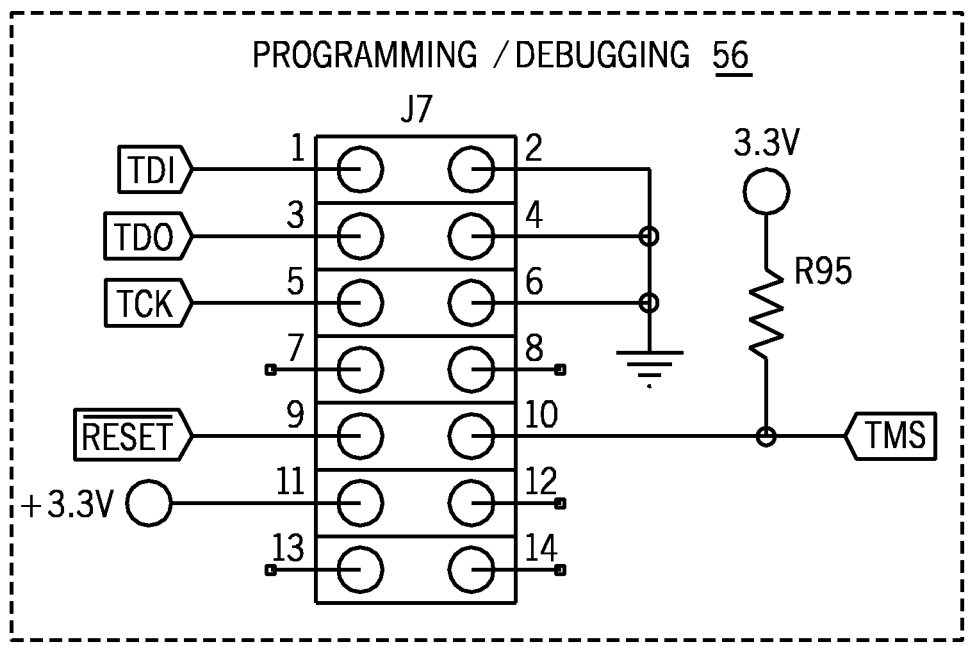
FIG. 4E is an electrical schematic of a programming/debugging circuit of the control circuit of FIG. 4A.
Figure 4F:
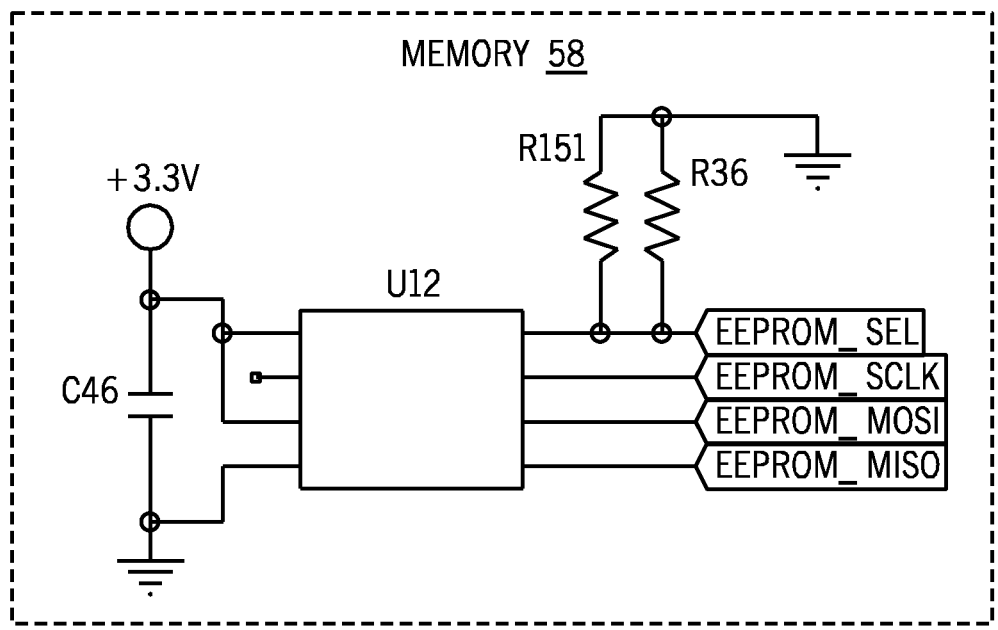
FIG. 4F is an electrical schematic of a memory circuit of the control circuit of FIG. 4A.
Figure 4G:
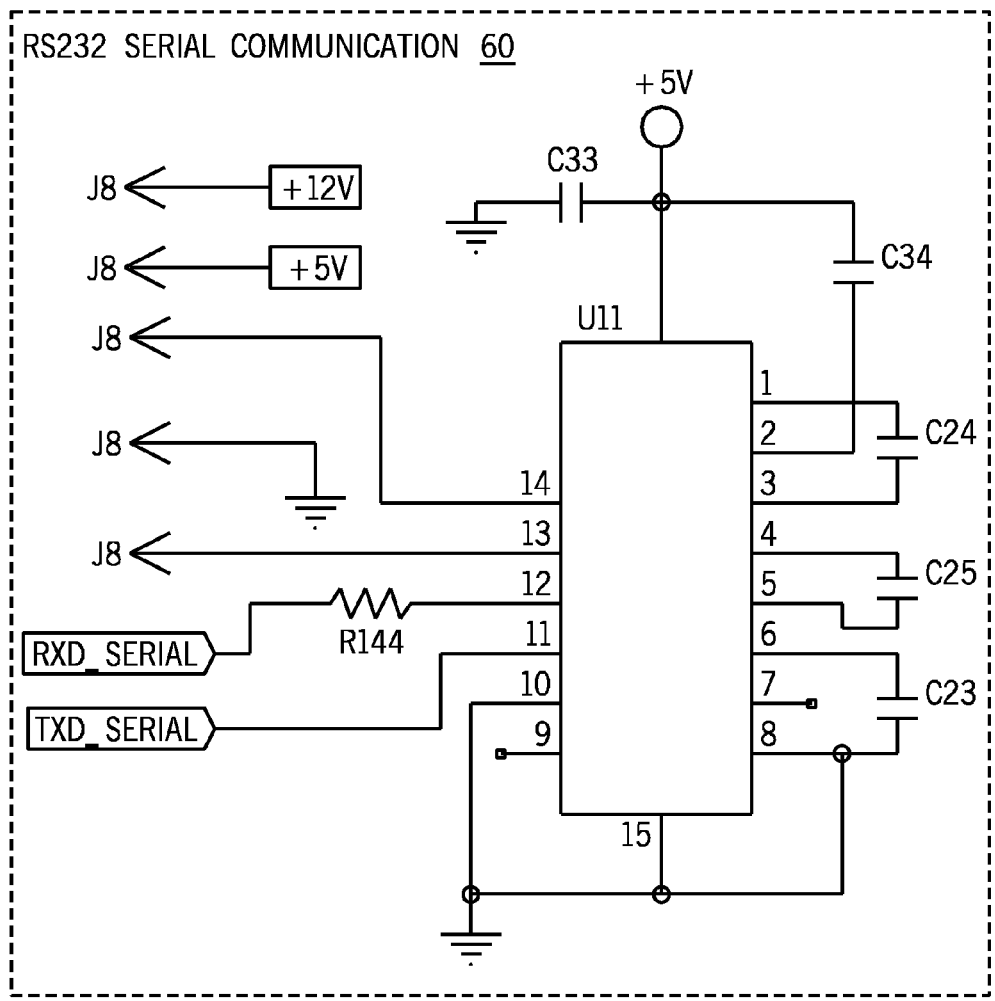
FIG. 4G is an electrical schematic of an RS232 serial communication circuit of the control circuit of FIG. 4A.

Additionally, commands and/or status outputs can be communicated through the RS232 serial communications port 60, as shown in FIG. 4G (e.g., via U11, junction J8 and RXD_SERIAL and TXD_SERIAL connections to pins 1 and 3, respectively, of the microcontroller U1), or the alternate serial communications port 54, as shown in FIG. 4D (e.g., via junction J4 and the RXD_SERIAL and TXD_SERIAL connections to pins 1 and 3, respectively, of the microcontroller U1). Also, programming and de-bugging can be accomplished through the JTAG port J7 and connections TDI, TDO, TCK, TMS, and /RESET, as shown in the programming/debugging circuit 56 of FIG. 4E, to pins 59, 64, 29, 63, and 31, respectively, of microcontroller U1.

Figure 4H:
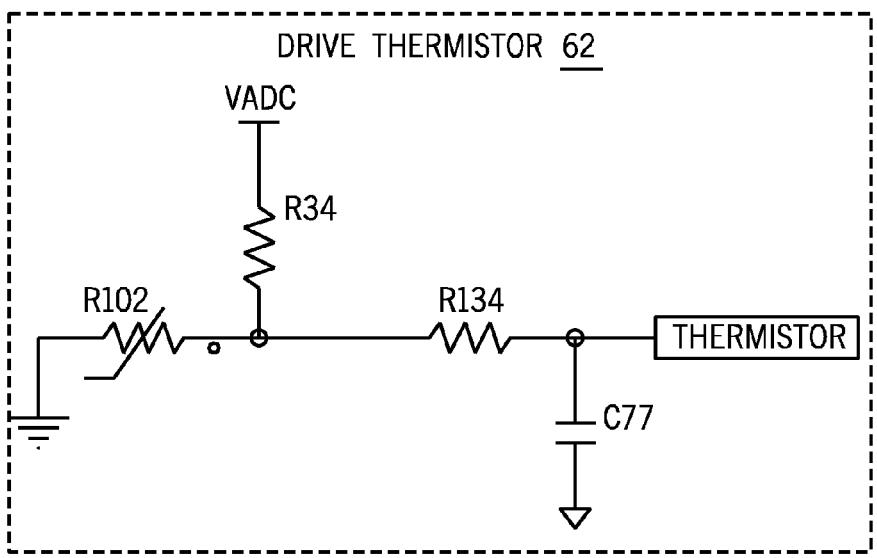
FIG. 4H is an electrical schematic of a drive thermistor circuit of the control circuit of FIG. 4A.
Figure 4I:
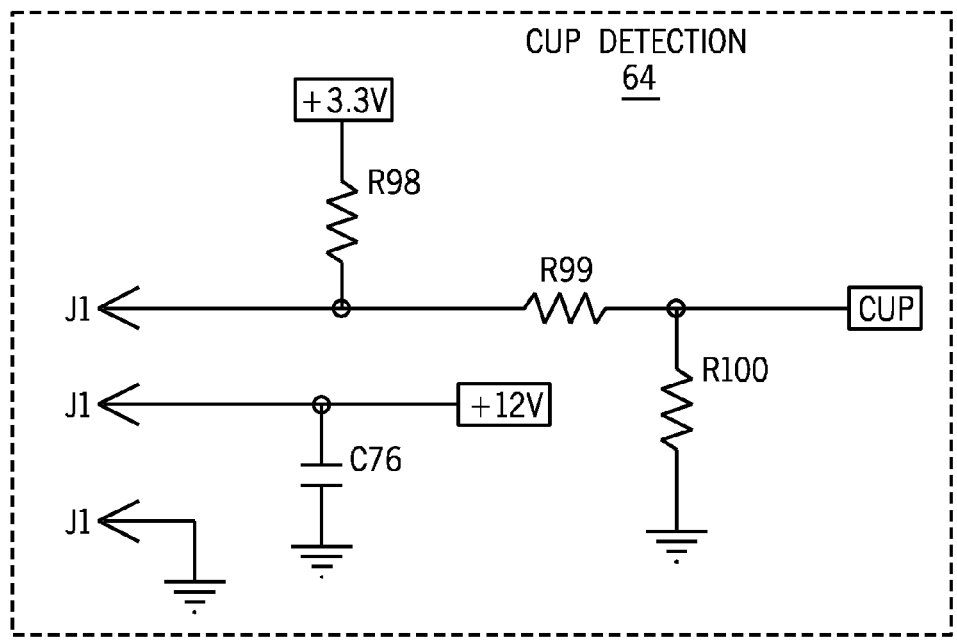
FIG. 4I is an electrical schematic of a cup detection circuit of the control circuit of FIG. 4A.
Figure 4J:
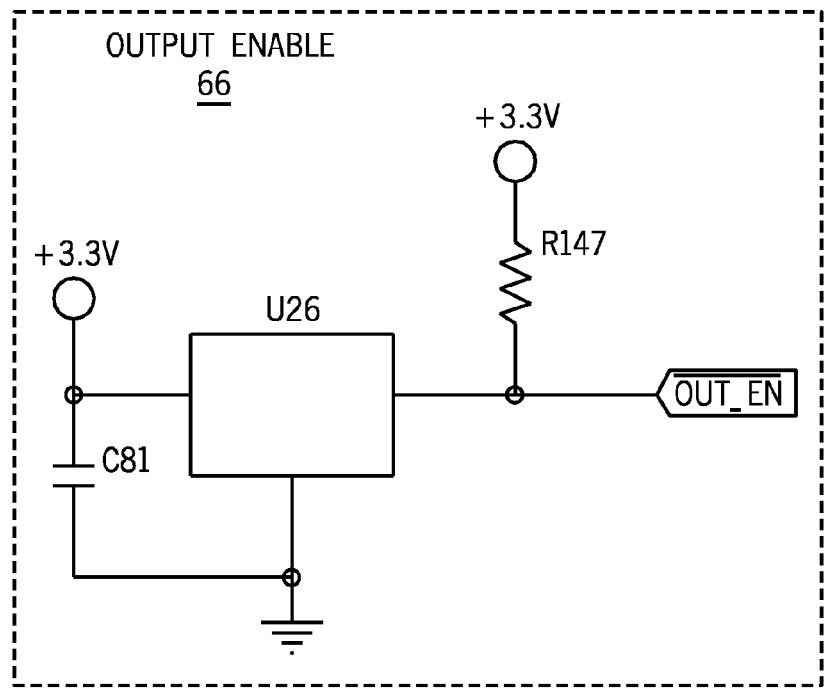
FIG. 4J is an electrical schematic of an output enable circuit of the control circuit of FIG. 4A.

The microcontroller U1 can operate both the blender and shaver motors, as described below. In addition, the microcontroller U1 can determine and respond to one or more of the following fault conditions: (1) "Motor stall fault," derived from Hall sensor inputs, described below; (2) "Motor over-temperature fault," via SHAVE_THERM and BLEND_THERM connections to pins 10 and 24, respectively, of the microcontroller U1, as shown in FIG. 4B; (3) "Drive over-temperature fault," via thermistor R102 and a THERMISTOR connection, as shown in FIG. 4H, to pin 20 of the microcontroller U1; (4) "Motor over-current fault," via S_OC and B_OC connections from the power supply circuit 40, as described below, to pins 45 and 19, respectively, of the microcontroller U1; (5) "Bus under-voltage fault," via a LOW_BUS connection from the comparators/optical isolation circuit 46, as described below, to pin 5 of the microcontroller U1; (6) "Shaver lid open fault," via a LID1 junction and a LID_SAFETY connection to pin 38 of the microcontroller U1, as shown in FIG. 4B; (7) "Insufficient dynamic brake relay current fault," via SHAVE_RLY_1 and BLEND_RLY_1 connections from the shaver power stage 42 and the blender power stage 44, respectively, as described below, to pins 11 and 22, respectively, of the microcontroller U1; and (8) "Blender cup not present fault," via a junction J1 and a CUP connection, as shown in the cup detection circuit 64 in FIG. 4I, to pin 9 of the microcontroller U1.

Many of the faults described above can be recorded in the memory 58, such as EEPROM U12 through connections EEPROM_SEL, EEPROM_SCLK, EEPROM_MOSI, and EEPROM_MISO, as shown in FIG. 4F, from pins 2, 42, 32, and 33, respectively, of the microcontroller U1. The memory 58 can be used for diagnostics, including recording faults, as well as for recording the number and size of drinks made. This data can be also communicated from the microcontroller U1 to an isolated handheld data terminal through TX and TX_RTN connections at junction LINE 1 (e.g., the mains power line of the local operating network), as shown in the input power conditioning and PFC circuit 48 in FIG. 9B to a TXD_HANDHELD connection at pin 26 of the microcontroller U1. In addition, a red light emitting diode (e.g., LED D21 from pin 31 of the microcontroller U1, as shown in FIG. 4B) can be controlled by the microcontroller U1 to flash at different rates and counts to indicate fault status for troubleshooting. Also, jumper J9 (in communication with the RESET connection at pin 31 of the microcontroller) can permit resetting of the microcontroller U1 and allow for re-programming.

The digital portion of the microcontroller operates from 3.3V, and the analog portion operates from voltage VADC (filtered 3.3V). Both the 3.3V logic supply and the voltage VADC are from the power supply circuit 40. The output enable stage 66 can include U26 to determine whether the 3.3V logic supply is less than 2.7 V. If the 3.3.V logic supply is less than 2.7 V, output to the motor drivers (e.g., through the power supply circuit 40) can be disabled through the connection /OUT_EN.

Figure 5A:
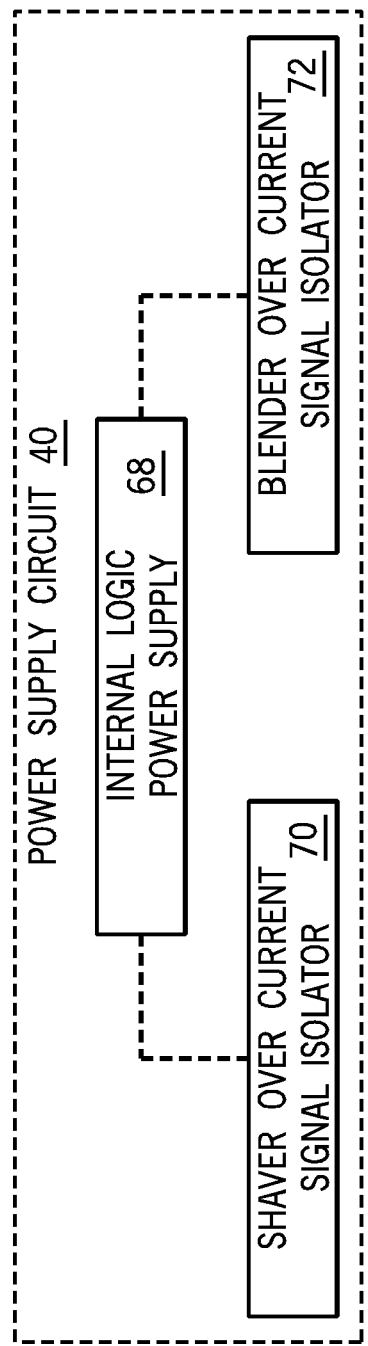
FIG. 5A is a block diagram of a power supply circuit according to one embodiment of the invention.

FIG. 5A illustrates the power supply circuit 40, which can include an internal logic power supply circuit 68, a shaver over current signal isolator 70, and a blender over current signal isolator 72. As shown in internal logic power supply circuit 68 of FIG. 5B, internal logic power can be derived from a 400V bus (i.e., the PFC output) through flyback converter U2 and transformer T1. The outputs from transformer T1 are as follows: (1) +12V (through diode D17 and capacitor C48) used to power relays K1 through K5, described below, and referenced to the control circuit 38; (2) +5V (through diode D18 and capacitor C31) used to power the control circuit 38 and referenced to the control circuit 38; (3) +15V (through diode D22 and capacitor C29) used to power the gate drives in the motor drivers of the shaver motor power stage 42 and the blender motor power stage 44, referenced to (−) bus, and isolated from the control circuit 38.

Figure 5B:
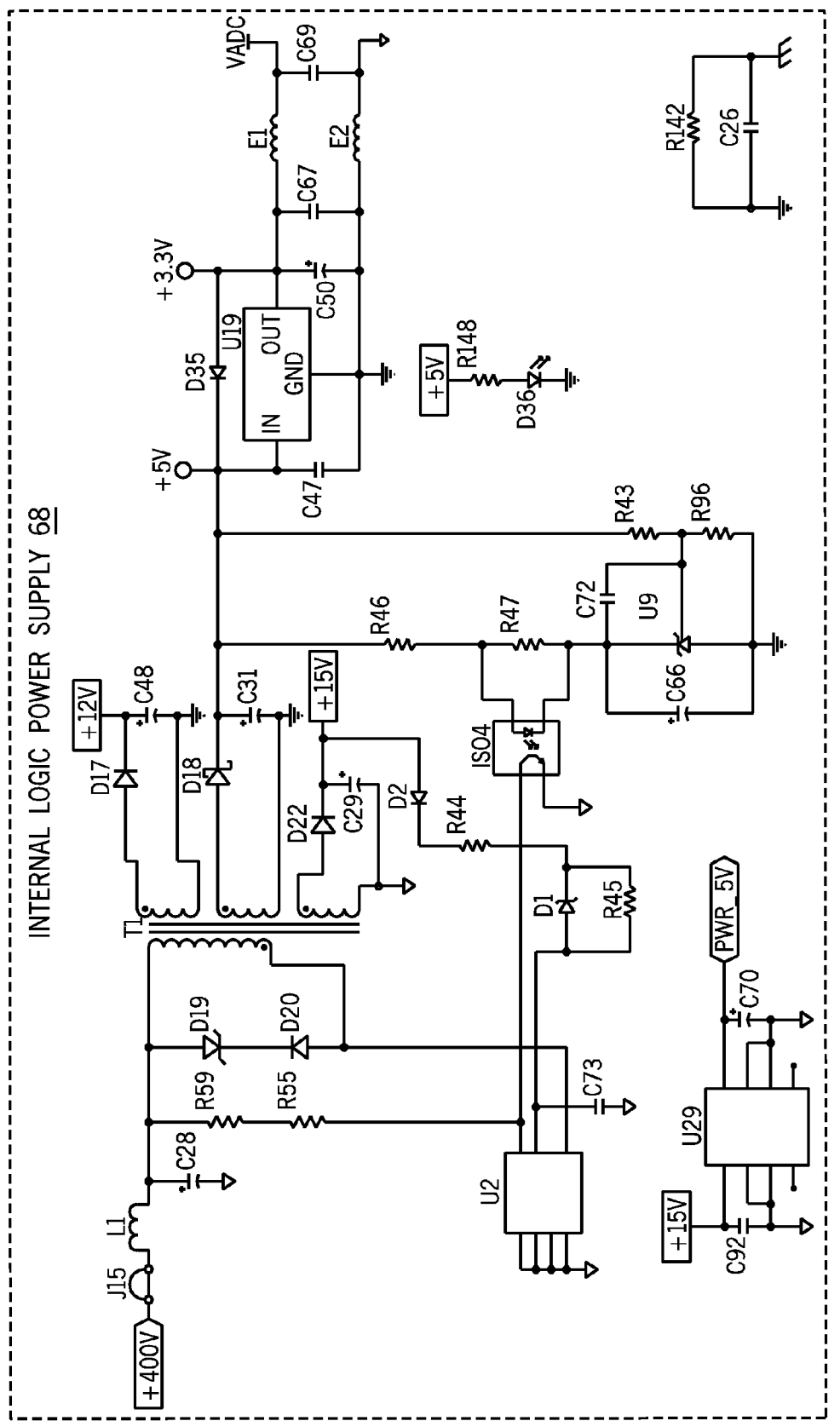
FIG. 5B is an electrical schematic of an internal logic supply circuit of the power supply circuit of FIG. 5A.

In addition, as shown in internal logic power supply circuit 68 of FIG. 5B, inductor L1 and capacitor C28 filter and bypass the 400V input. Diodes D19 and D20 act as snubbers to limit the transient flyback voltage due to the primary coil leakage inductance of transformer T1. The circuitry around shunt regulator U9 and optocoupler ISO4 close the voltage control loop of flyback converter U2. Diode D2 and resistor R44 act as an overvoltage shutdown in the event of the loss of voltage feedback through optocoupler ISO4.

U19 is a 3.3V regulator, with its input received from the +5V supply. Inductors E1 and E2 filter the 3.3V supply to form the voltage VADC for the analog portion of the microcontroller U1. U29 is a regulator for the supply voltage PRW_5V, used for reference voltages and analog circuit supply for the motor power stages 42, 44. U29 receives power from the +15V supply for the gate drives, is referenced to (−) bus, and is isolated from the control circuits. Capacitor C26 and resistor R142 bypass the control circuit common to earth ground.

Figure 5C:
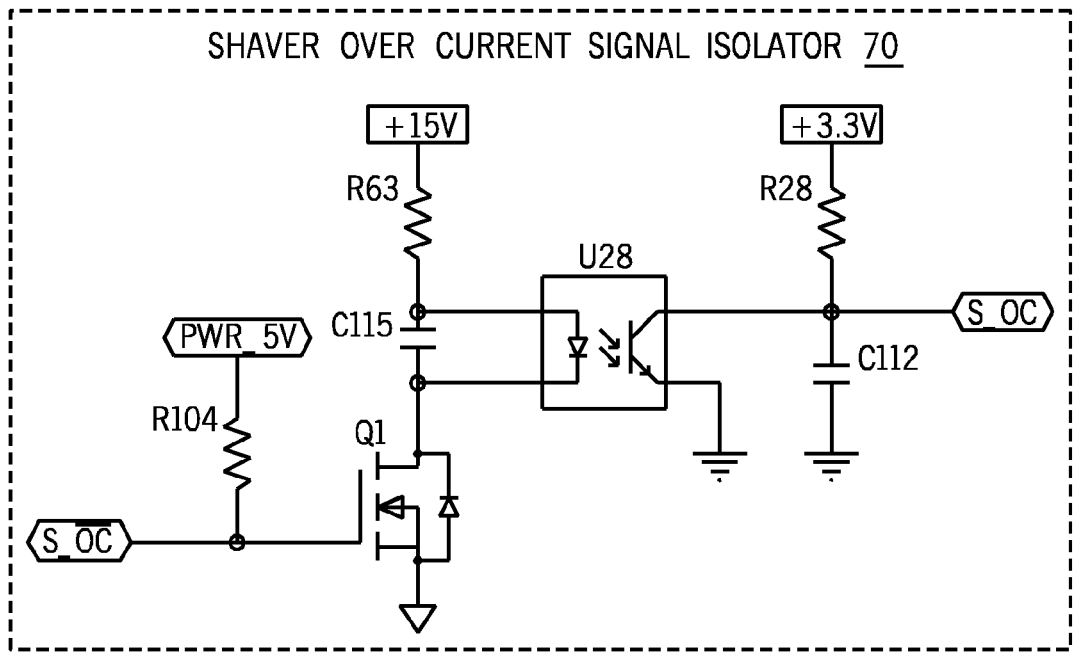
FIG. 5C is an electrical schematic of a shaver over current signal isolator circuit of the power supply circuit of FIG. 5A.
Figure 5D:
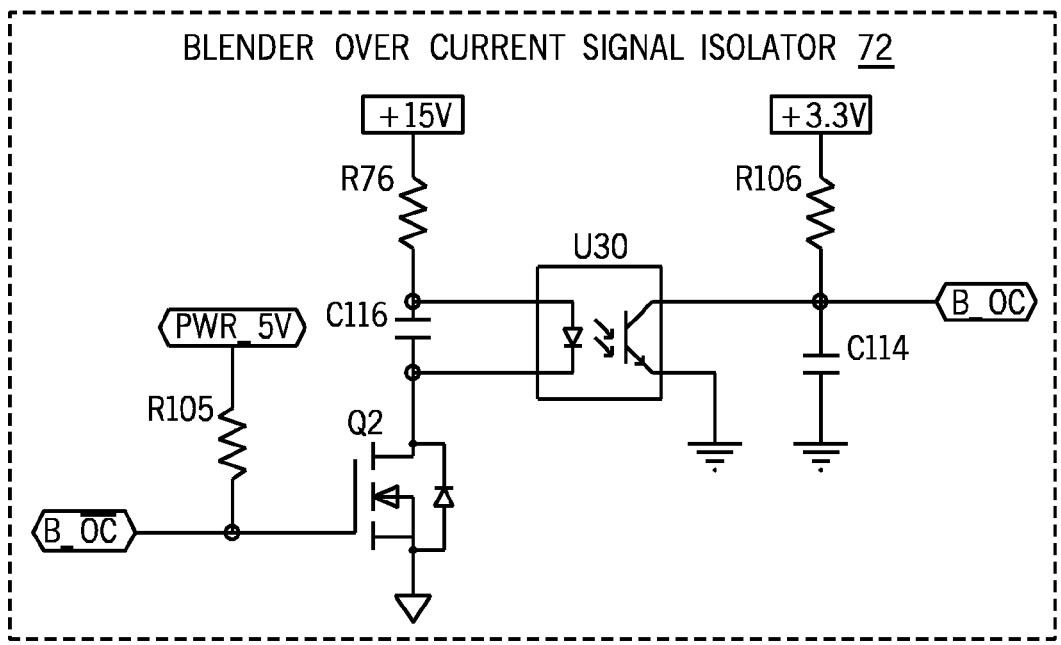
FIG. 5D is an electrical schematic of a blender over current signal isolator circuit of the power supply circuit of FIG. 5A.

The shaver over current signal isolator 70, as shown in FIG. 5C, includes optocoupler U28, which isolates the shaver over current signal /S_OC from the shaver motor power stage 42 and the shaver over current signal S_OC to the microcontroller U1. Similarly, the blender over current signal isolator 72, as shown in FIG. 5D, includes optocoupler U30, which isolates the blender over current signal /B_OC from the blender motor power stage 44 and the blender over current signal B_OC to the microcontroller U1.

Figures 1, 6B:
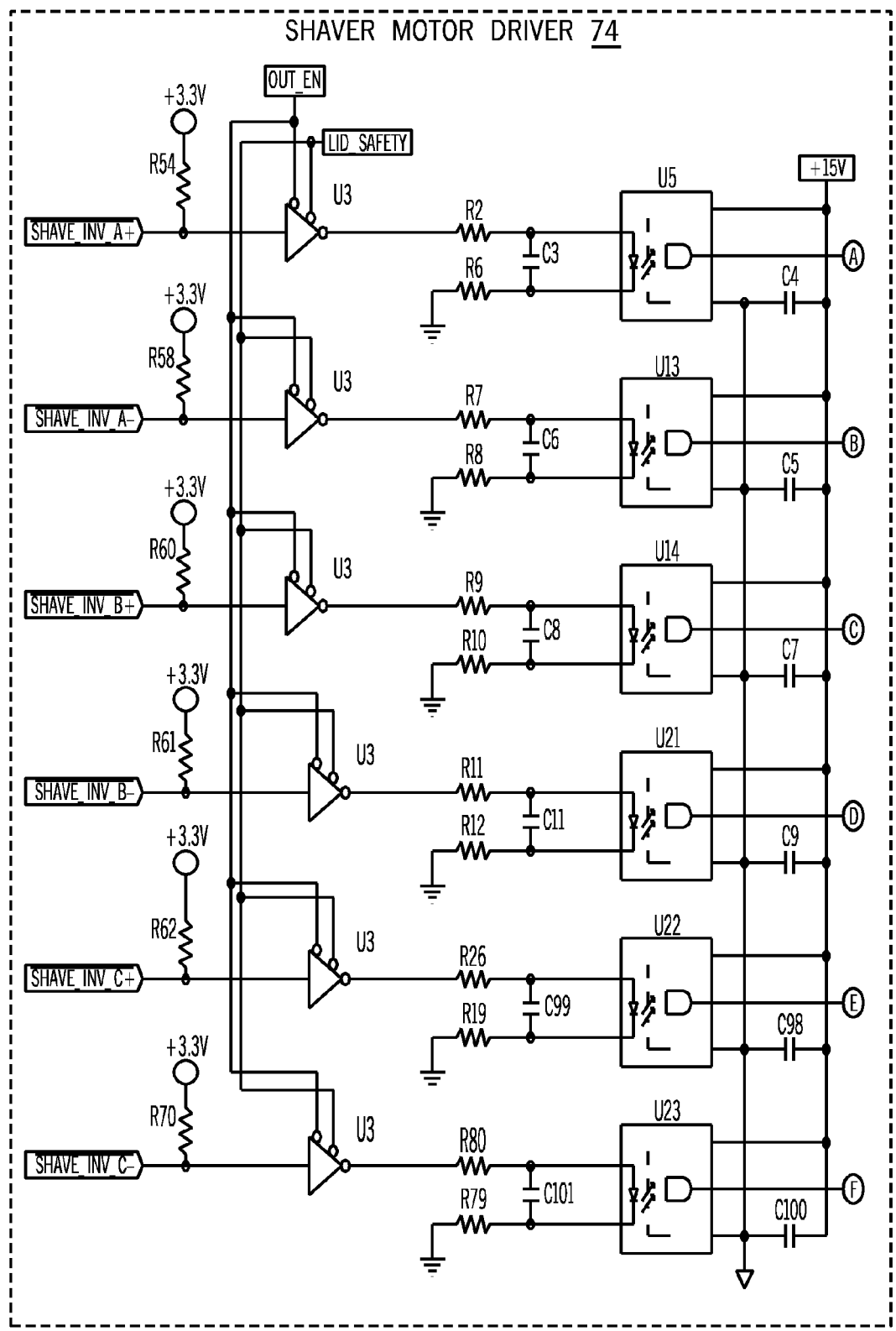
Figures 2, 6B:
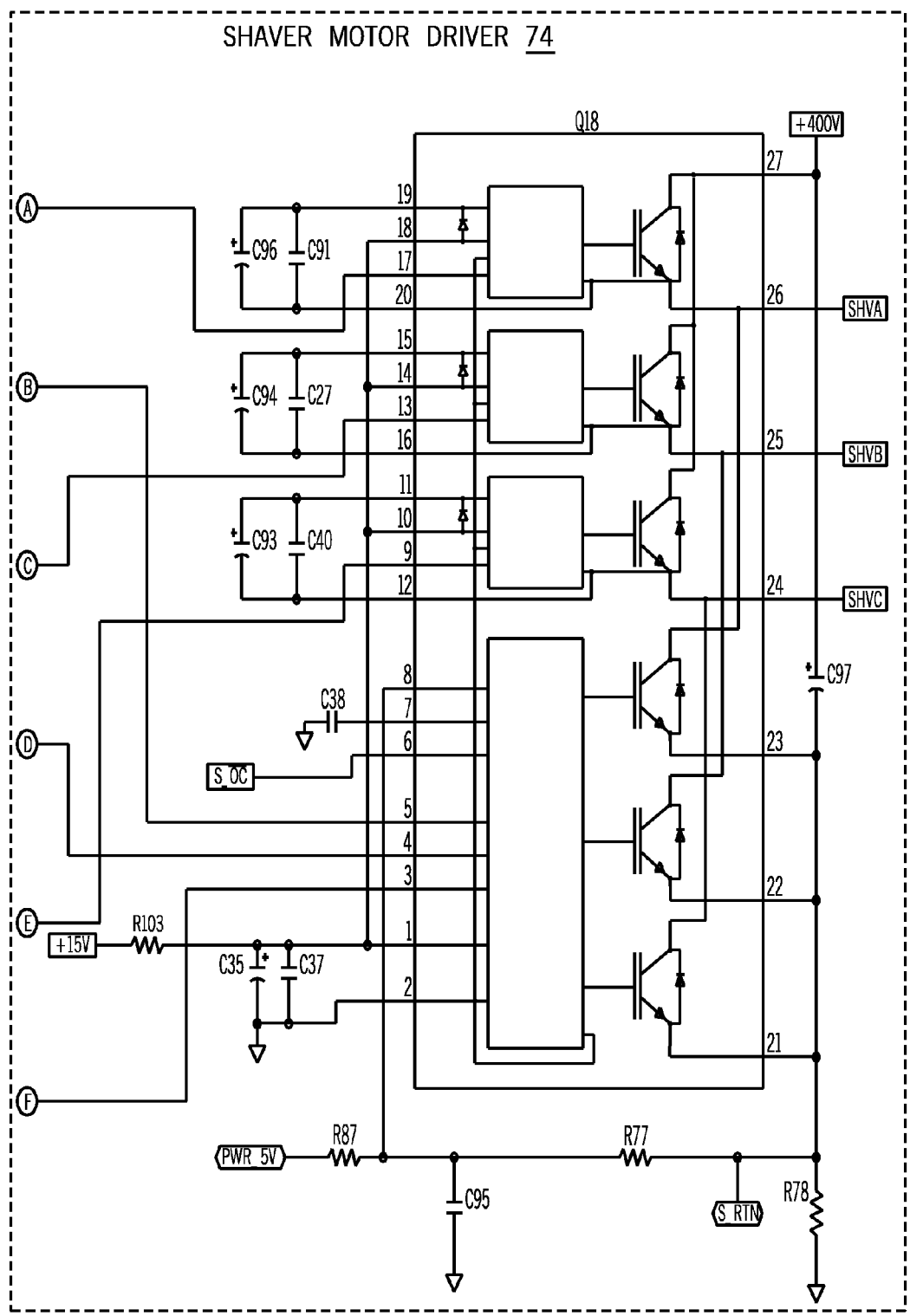

FIG. 6A illustrates the shaver motor power stage 42, including a shaver motor driver 74, shaver motor connections 76, and shaver brake relays 78. The shaver motor driver 74, as shown in FIGS. 6B-1 and 6B-2, receives gate drive signals /SHAVE_INV_A+, /SHAVE_INV_A−, /SHAVEINV_B+, /SHAVEINV_B−, /SHAVE_INV_C+, and /SHAVE_INV_C− from the microcontroller U1 (more specifically, from pins 61, 39, 62, 43, 13, and 48, respectively, from the microcontroller U1). Buffers U3 each buffer the shaver gate drive signals from the microcontroller U1 and drive the opto-isolators U5, U13, U14, U21, U22, and U23. Buffers U3 are shut down if the shaver lid is open (i.e., via the LID_SAFETY connection, as shown in FIG. 4B), or if the logic supply falls below 2.7 volts (i.e., via the OUT_EN connection from the output enable circuit 66, as described above). Q18 is an intelligent power module (IPM) which receives the gate drive signals from the opto-isolators described above. Q18 includes six insulated gate bipolar transistors (IGBTs) and free-wheeling diodes, associated gate drives, and switches the voltage from the 400V bus into the three phases of the shaver motor: SHVA SHVB, and SHVC. Power for the IPM internal logic and gate drives of Q18 (e.g., +15V) is filtered and bypassed by resistor R103 and capacitor C35. Current sensing can be determined through shunt resistor R78 (e.g., to connection S_RTN), which can be used for both pulse-by-pulse current limiting by the microcontroller U1 and over current shutdown inside Q18. Fault protection for the shaver motor can include under-voltage lockout, over-current shutdown, and over-temperature shutdown, as controlled by the microcontroller U1.

Figure 6C:
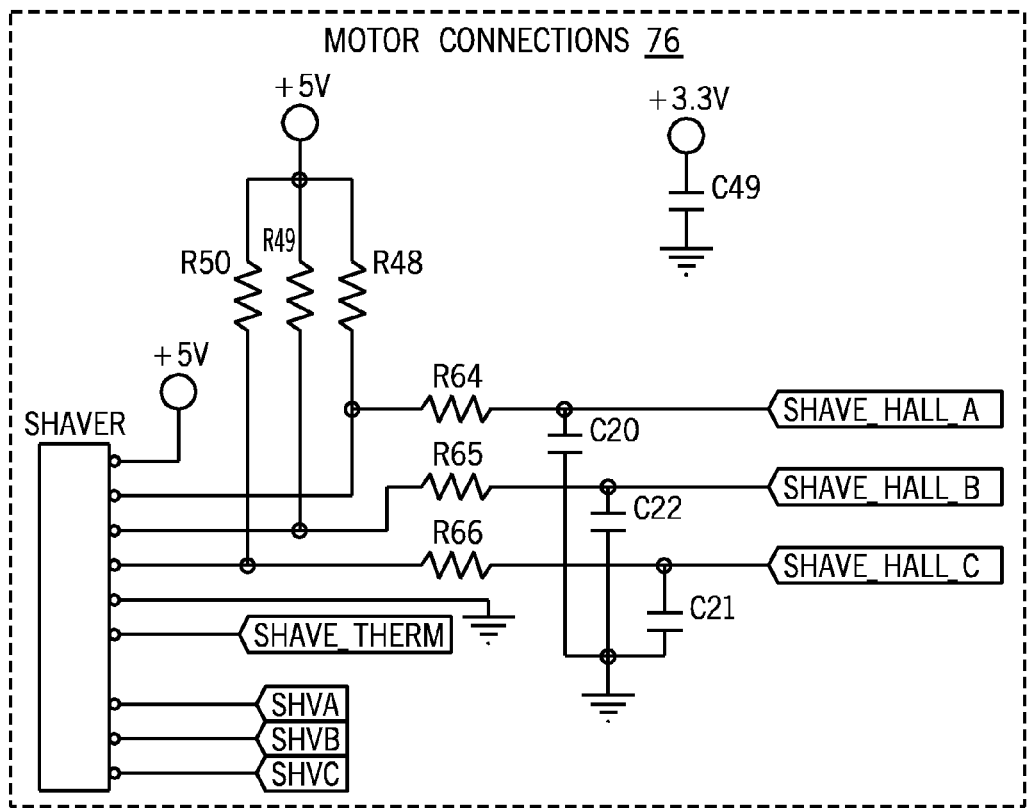
FIG. 6C is an electrical schematic of shaver motor connections of the shaver motor power stage of FIG. 6A.

FIG. 6C illustrates the shaver motor connections 76. As shown in FIG. 6C, the SHAVER connector makes the motor phase (SHVA, SHVB, SHVC), thermistor (SHAVE_THERM), and Hall effect rotor position sensor (SHAVE_HALL_A, SHAVE_HALL_B, SHAVE_HALL_C) connections to the shaver motor. Motor rotor position can be received by the microcontroller U1 from three Hall effect sensors in the shaver motor for motor commutation (i.e., via connection SHAVE_HALL_A to pin 60 of the microcontroller U1, connection SHAVE_HALL_B to pin 30 of the microcontroller U1, and connection SHAVE_HALL_C to pin 6 of the microcontroller U1).

Figure 6D:
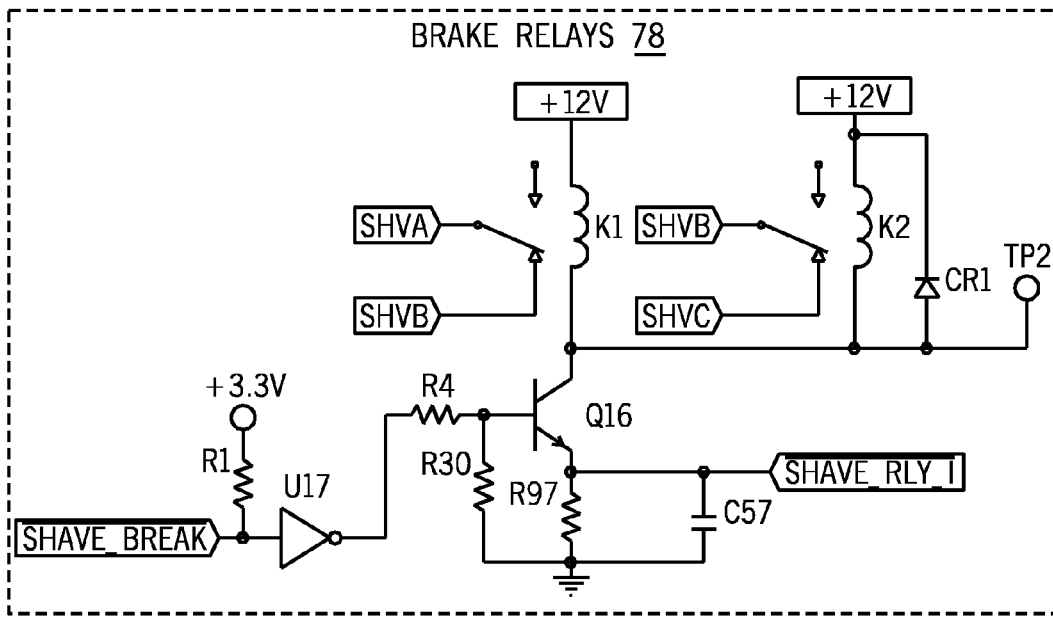
FIG. 6D is an electrical schematic of shaver brake relays of the shaver motor power stage of FIG. 6A.

FIG. 6D illustrates the shaver brake relays 78. Relays K1 and K2 are normally closed and short the three motor leads (i.e., SHVA, SHVB, and SHVC) together to dynamically brake the shaver motor in the event of a power loss. Switching transistor Q16 drives the relay coils based on a /SHAVE_BRAKE signal from the microcontroller U1 (i.e., from pin 52 of the microcontroller U1, as shown in FIG. 4B). Resistor R97 is a current sensing resistor for the relay coils and must be relatively high in order for the microcontroller U1 to send gate signals to the IPM. This can prevent turning the IPM Q18 into a short circuit. Low or insufficient relay current is communicated to the microcontroller U1 (more specifically, to pin 12 of the microcontroller) via the connection /SHAVE_RLY_I.

Figure 7A:
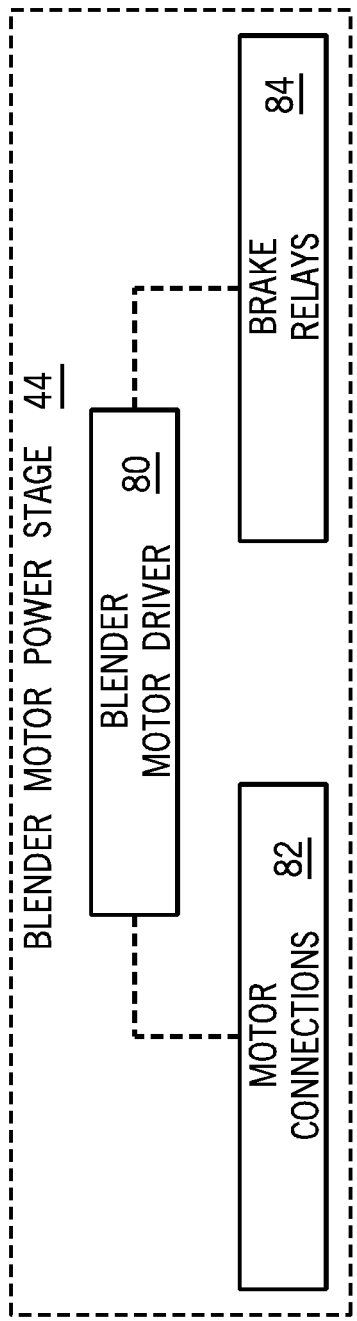
FIG. 7A is a block diagram of a blender motor power stage according to one embodiment of the invention.
Figures 1, 7B:
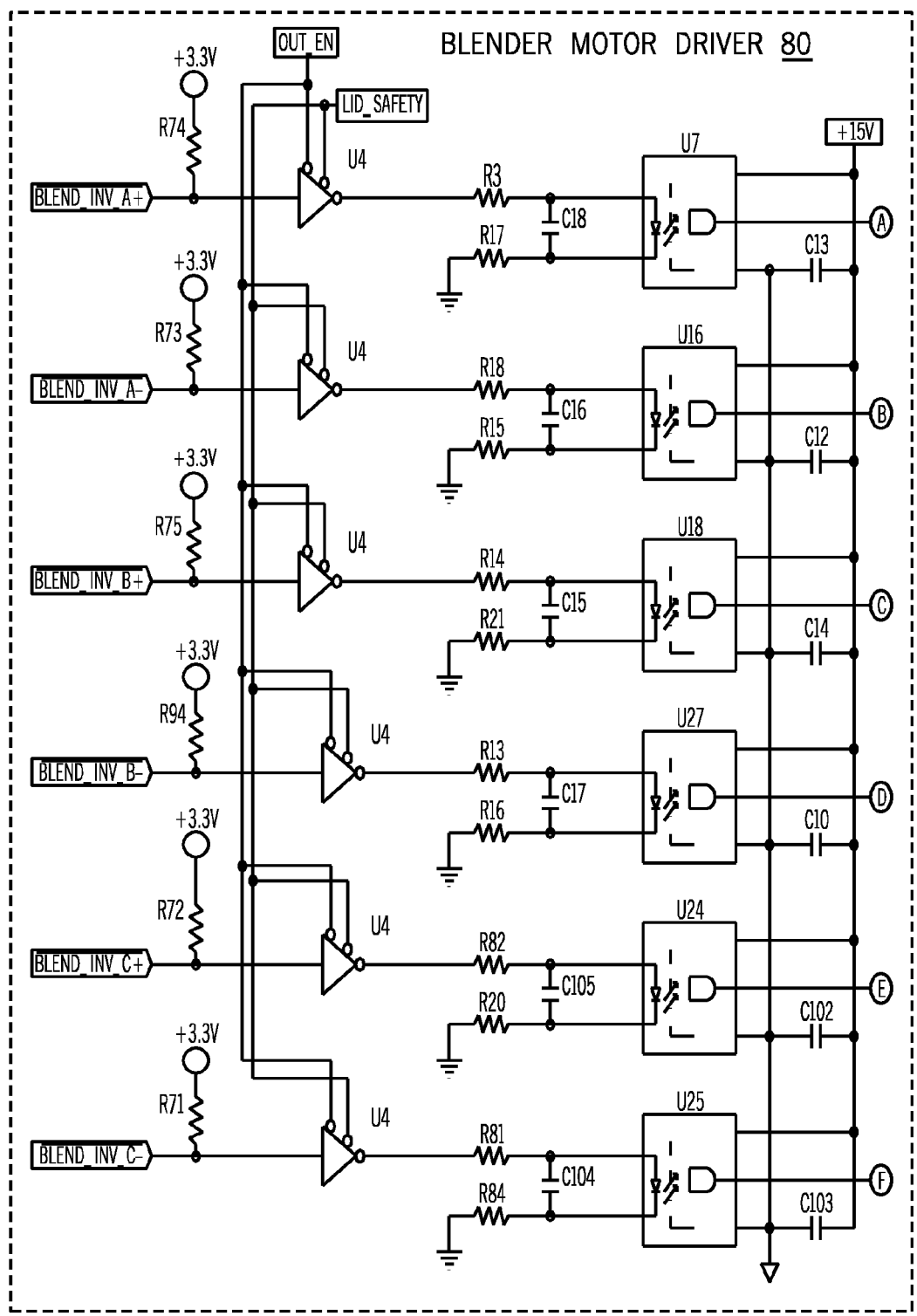
Figures 2, 7B:
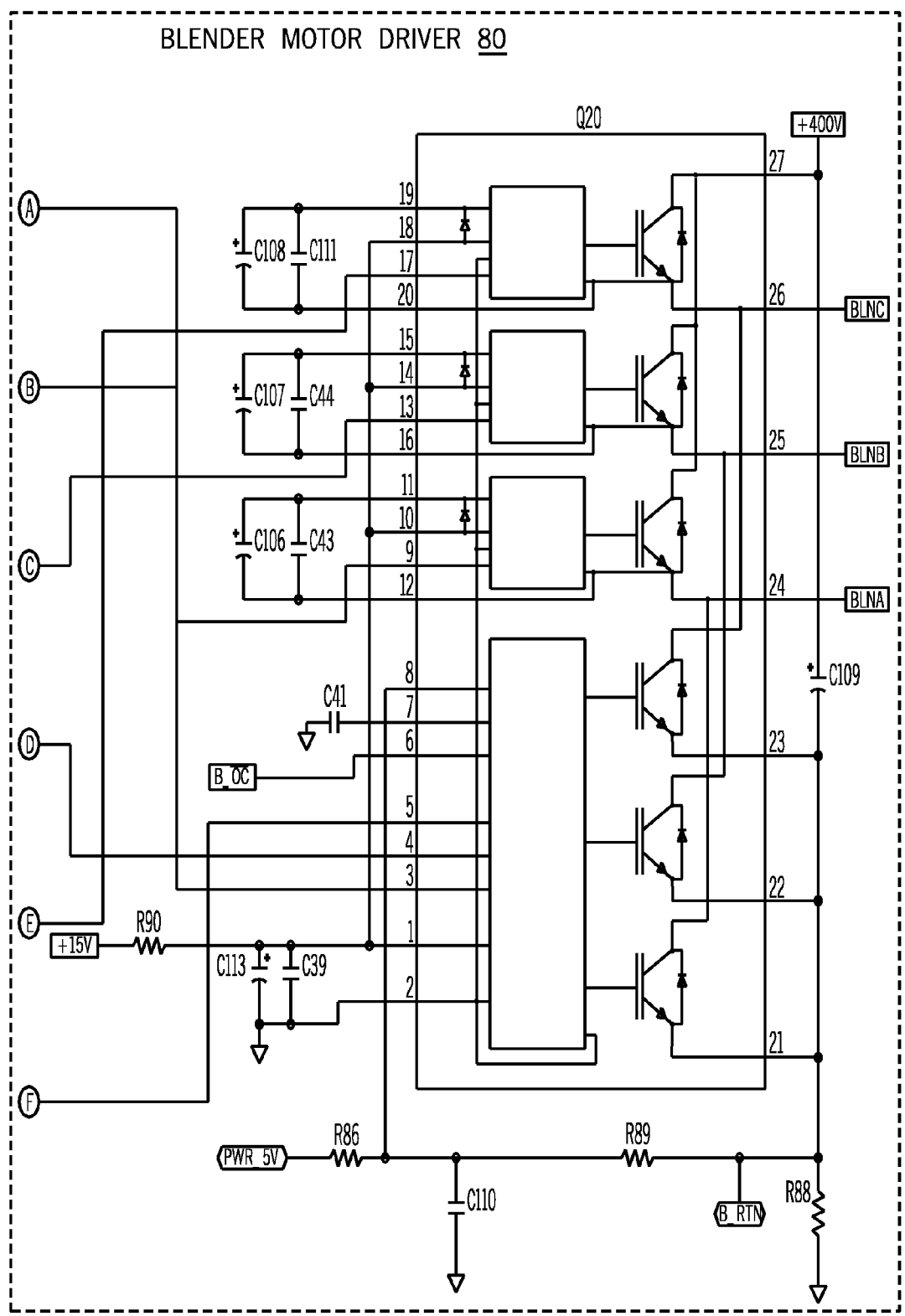

Similarly, FIG. 7A illustrates the blender motor power stage 44, including a blender motor driver 80, shaver motor connections 82, and shaver brake relays 84. The blender motor driver 80, as shown in FIGS. 7B-1 and 7B-2, receives gate drive signals /BLEND_INV_A+, /BLEND_INV_A−, /BLEND_INV_B+, /BLEND_INV_B−, /BLEND_INV_C+, and /BLEND_INV_C− from the microcontroller U1 (more specifically, from pins 25, 47, 23, 55, 21, and 56, respectively, from the microcontroller U1). Buffers U4 each buffer the shaver gate drive signals from the microcontroller U1 and drive the opto-isolators U7, U16, U18, U27, U24, and U25. Buffers U3 are shut down if the shaver lid is open (i.e., via the LID_SAFETY connection, as shown in FIG. 4B), or if the logic supply falls below 2.7 volts (i.e., via the OUT_EN connection from the output enable circuit 66, as described above). Q20 is an IPM which receives the gate drive signals from the opto-isolators described above. Q20 includes six IGBTs and free-wheeling diodes, associated gate drives, and switches the voltage from the 400V bus into the three phases of the blender motor: BLNA BLNB, and BLNC. Power for the IPM internal logic and gate drives of Q20 (e.g., +15V) is filtered and bypassed by resistor R90 and capacitor C113. Current sensing can be determined through shunt resistor R88 (e.g., to connection B_RTN), which can be used for both pulse-by-pulse current limiting by the microcontroller U1 and over current shutdown inside Q20. Fault protection for the shaver motor can include under-voltage lockout, over-current shutdown, and over-temperature shutdown, as controlled by the microcontroller U1.

Figure 7C:
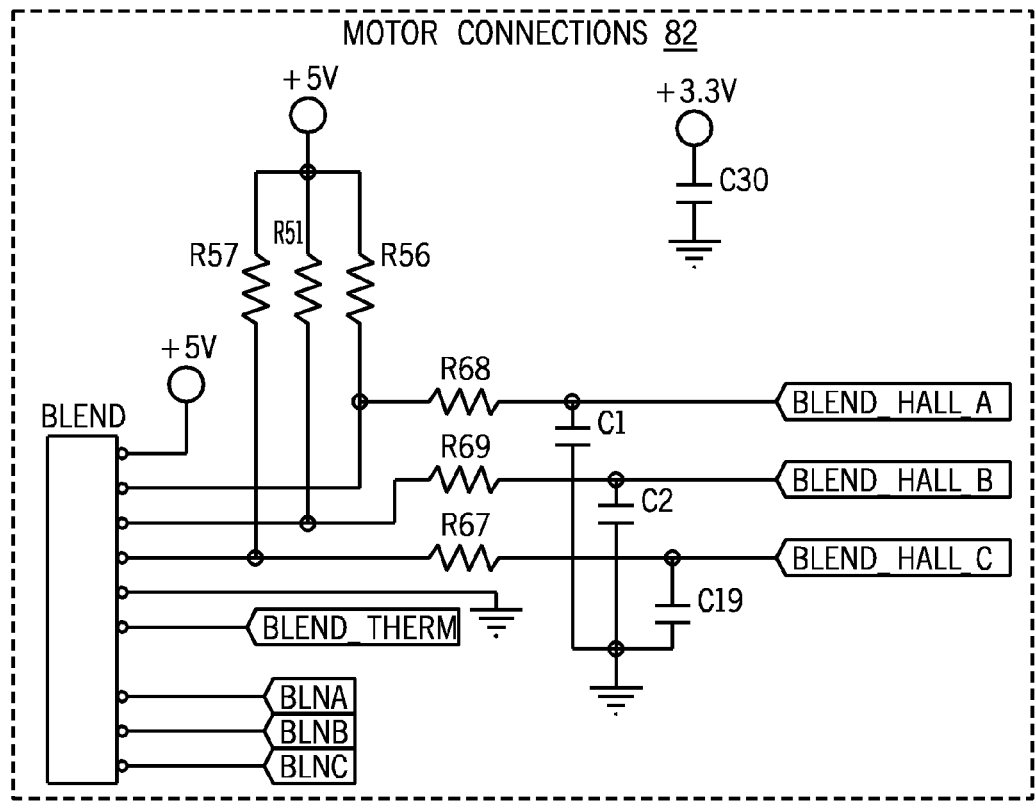
FIG. 7C is an electrical schematic of blender motor connections of the blender motor power stage of FIG. 7A.

FIG. 7C illustrates the blender motor connections 82. As shown in FIG. 7C, the BLEND connector makes the motor phase (BLNA, BLNB, BLNC), thermistor (BLEND_THERM), and Hall effect rotor position sensor (BLEND_HALL_A, BLEND_HALL_B, BLEND_HALL_C) connections to the blender motor. Motor rotor position can be received by the microcontroller U1 from three Hall effect sensors in the blender motor for motor commutation (i.e., via connection BLEND_HALL_A to pin 34 of the microcontroller U1, connection BLEND_HALL_B to pin 44 of the microcontroller U1, and connection BLEND_HALL_C to pin 37 of the microcontroller U1).

Figure 7D:
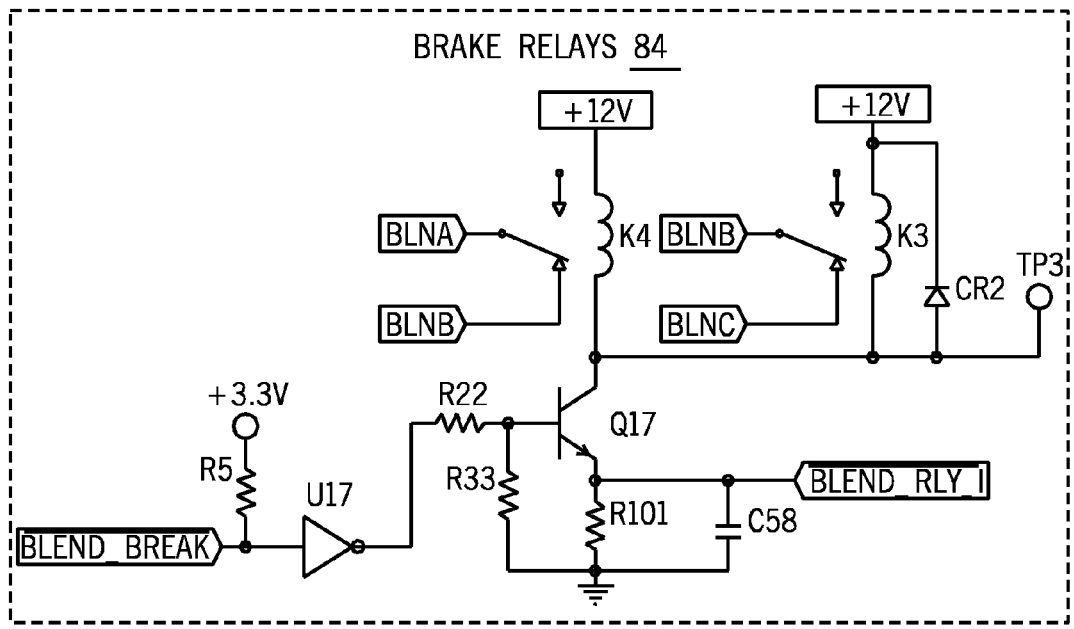
FIG. 7D is an electrical schematic of blender brake relays of the blender motor power stage of FIG. 7A.

FIG. 7D illustrates the blender brake relays 84. Relays K3 and K4 are normally closed and short the three motor leads (i.e., BLNA, BLNB, and BLNC) together to dynamically brake the blender motor in the event of a power loss. Switching transistor Q17 drives the relay coils based on a /BLEND_BRAKE signal from the microcontroller U1 (i.e., from pin 53 of the microcontroller U1, as shown in FIG. 4B). Resistor R101 is a current sensing resistor for the relay coils and must be relatively high in order for the microcontroller U1 to send gate signals to the IPM. This can prevent turning the IPM Q20 into a short circuit. Low or insufficient relay current is communicated to the microcontroller U1 (more specifically, to pin 22 of the microcontroller) via the connection /BLEND_RLY_I.

Figure 8A:
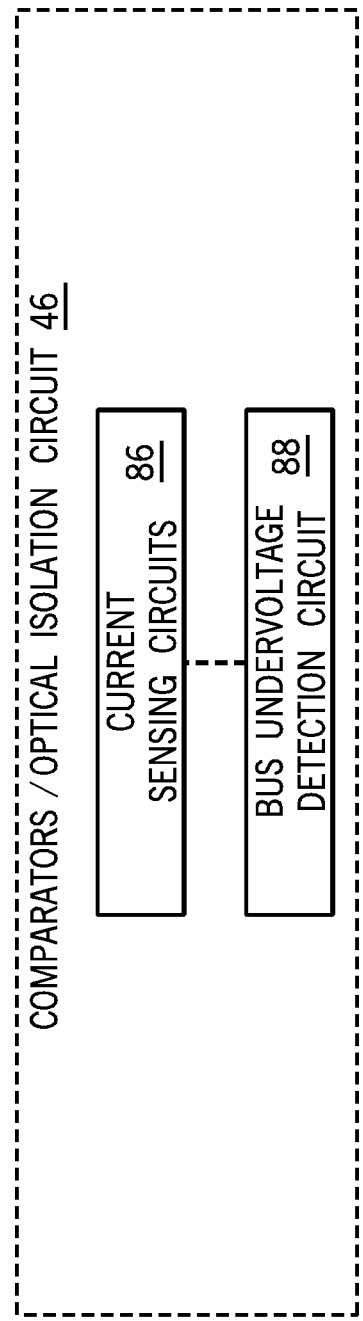
FIG. 8A is a block diagram of a comparators and optical isolation circuit according to one embodiment of the invention.
Figure 8B:
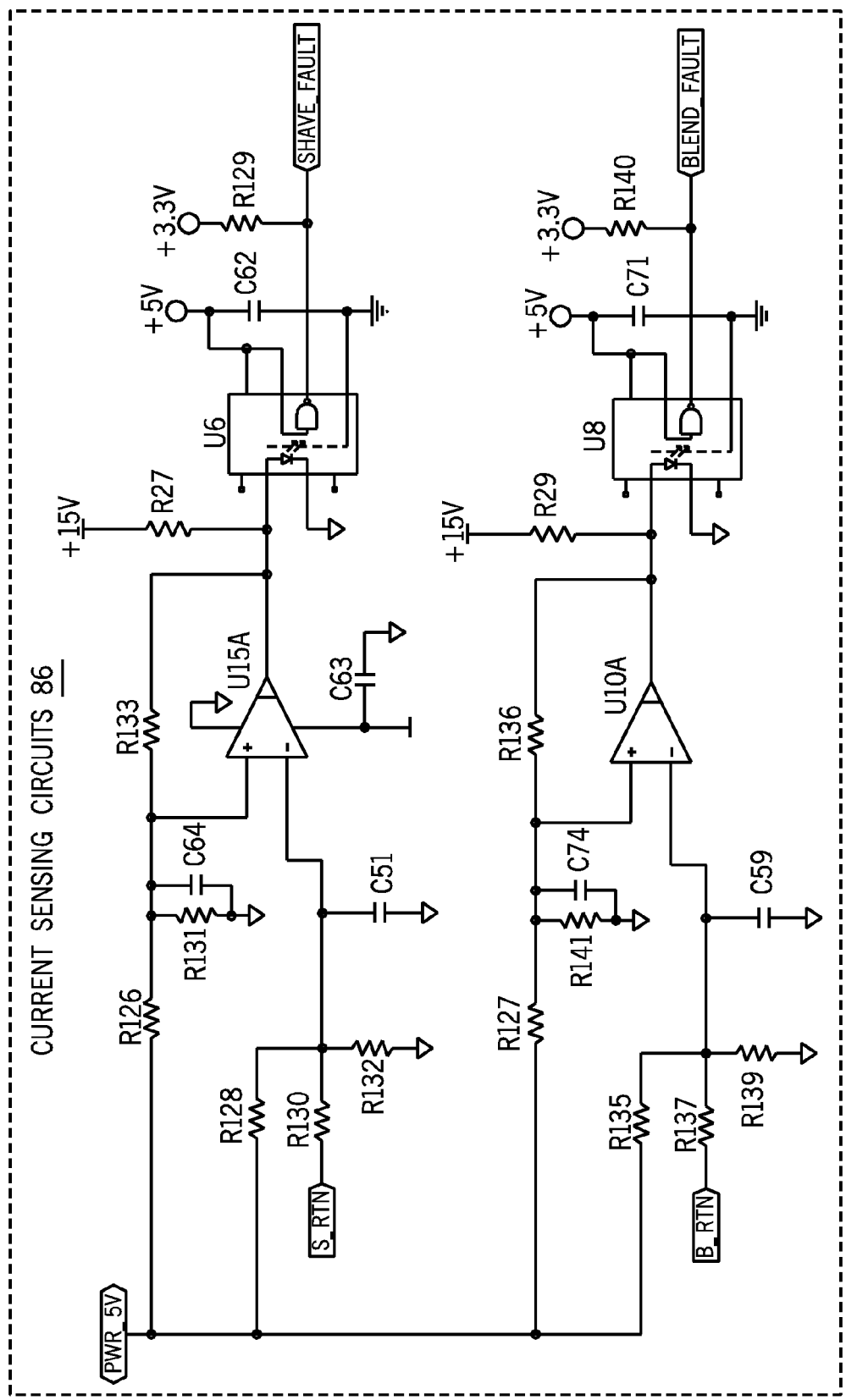
FIG. 8B is an electrical schematic of current sensing circuits of the comparators and optical isolation circuit of FIG. 8A.

FIG. 8A illustrates the comparators and optical isolation circuit 46, which can include current sensing circuits 86 and a bus undervoltage detection circuit 88. The current sensing circuits 86, as shown in FIG. 8B, includes comparator U15A, which compares the voltage on the shaver current sensing resistor R78, via the connection S_RTN, to a fixed threshold. When the current level is exceeded, comparator UI5A output goes low and turns off opto-isolator U6, triggering a pulse-by-pulse current limit function in the microcontroller U1. Similarly, comparator U10A, which compares the voltage on the blender current sensing resistor R88, via the connection B_RTN, to a fixed threshold. When the current level is exceeded, comparator U10A output goes low and turns off opto-isolator U8, triggering a pulse-by-pulse current limit function in the microcontroller U1. Pulse-by-pulse current limiting is enacted by inputs to the microcontroller U1 from the SHAVE_FAULT and BLEND_FAULT connections (i.e., to pins 4 and 36, respectively, of the microcontroller U1, as shown in FIG. 4B).

Figure 8C:
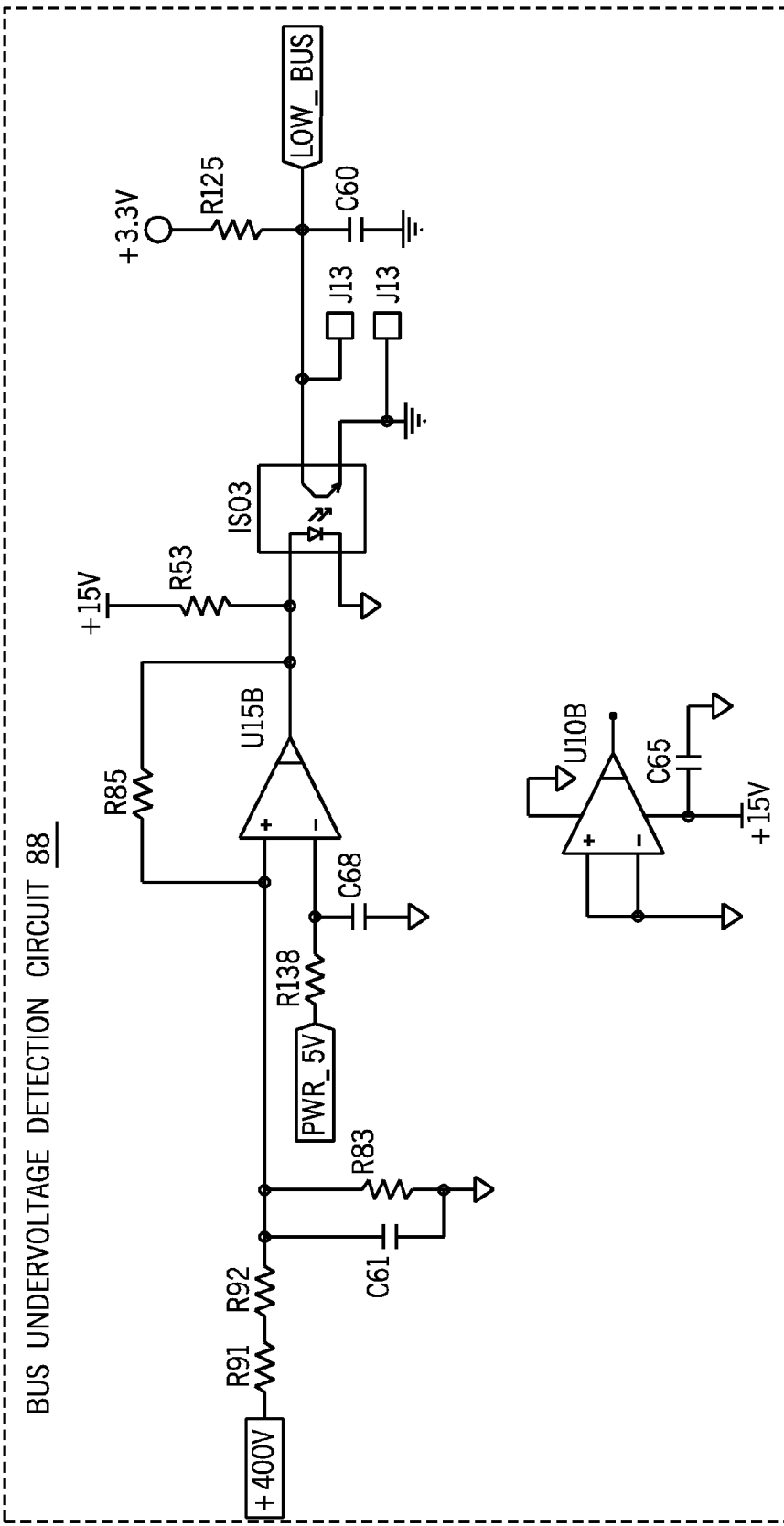
FIG. 8C is an electrical schematic of a bus undervoltage detection circuit of the comparators and optical isolation circuit of FIG. 8A.

The bus overvoltage circuit 88, as shown in FIG. 8C, includes a comparator U15B, which goes low if the 400V bus falls below 80 volts. This turns off opto-isolator IS3 and signals the microcontroller U1 to shut off the motors and record all data to the memory 58 before logic power is lost. In some embodiments, the microcontroller U1 will not begin to operate the motors until the 400V bus rises above 87 volts.

Figure 9A:
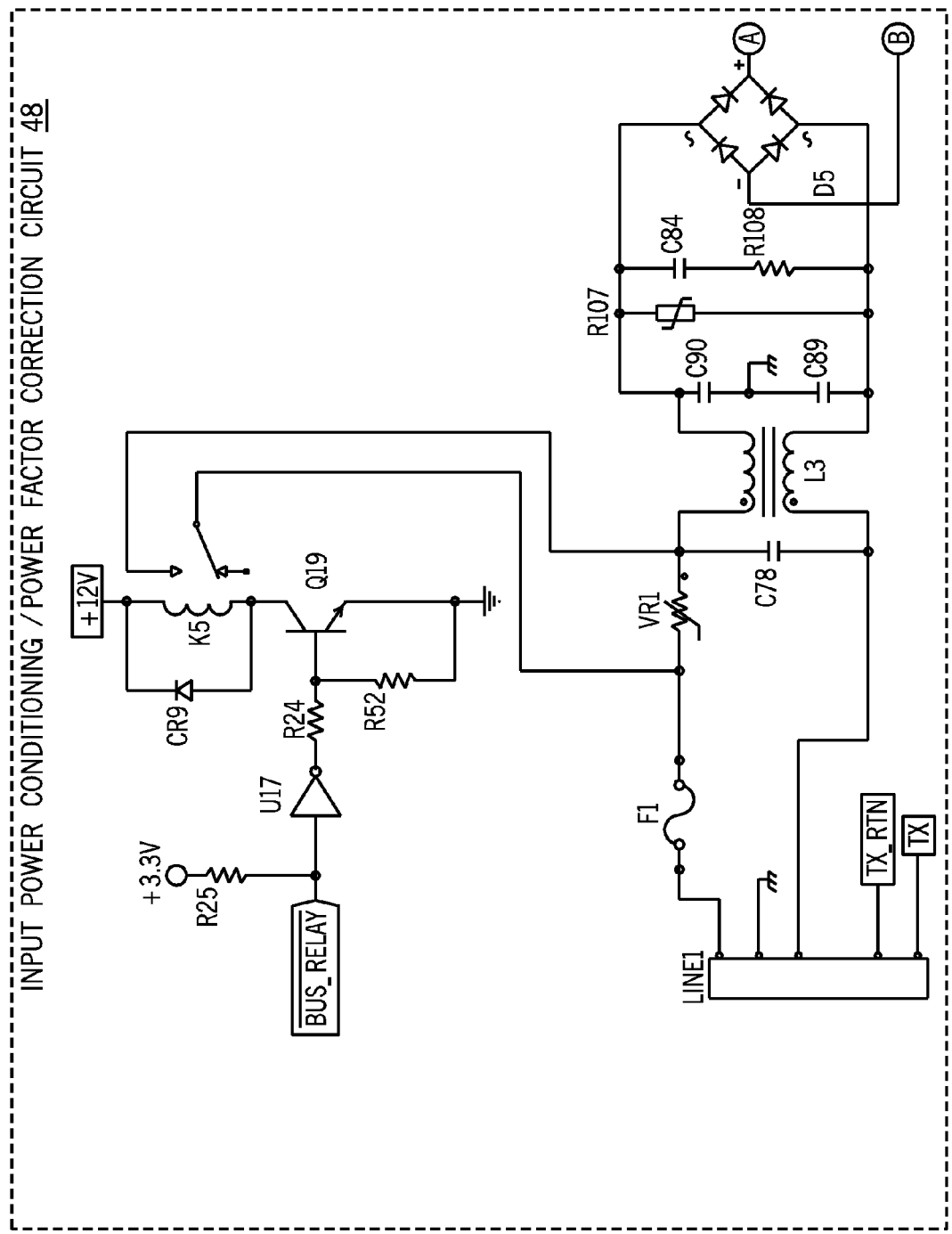
FIGS. 9A and 9B are electrical schematics of an input power conditioning and power factor correction circuit according to one embodiment of the invention.
Figure 9B:
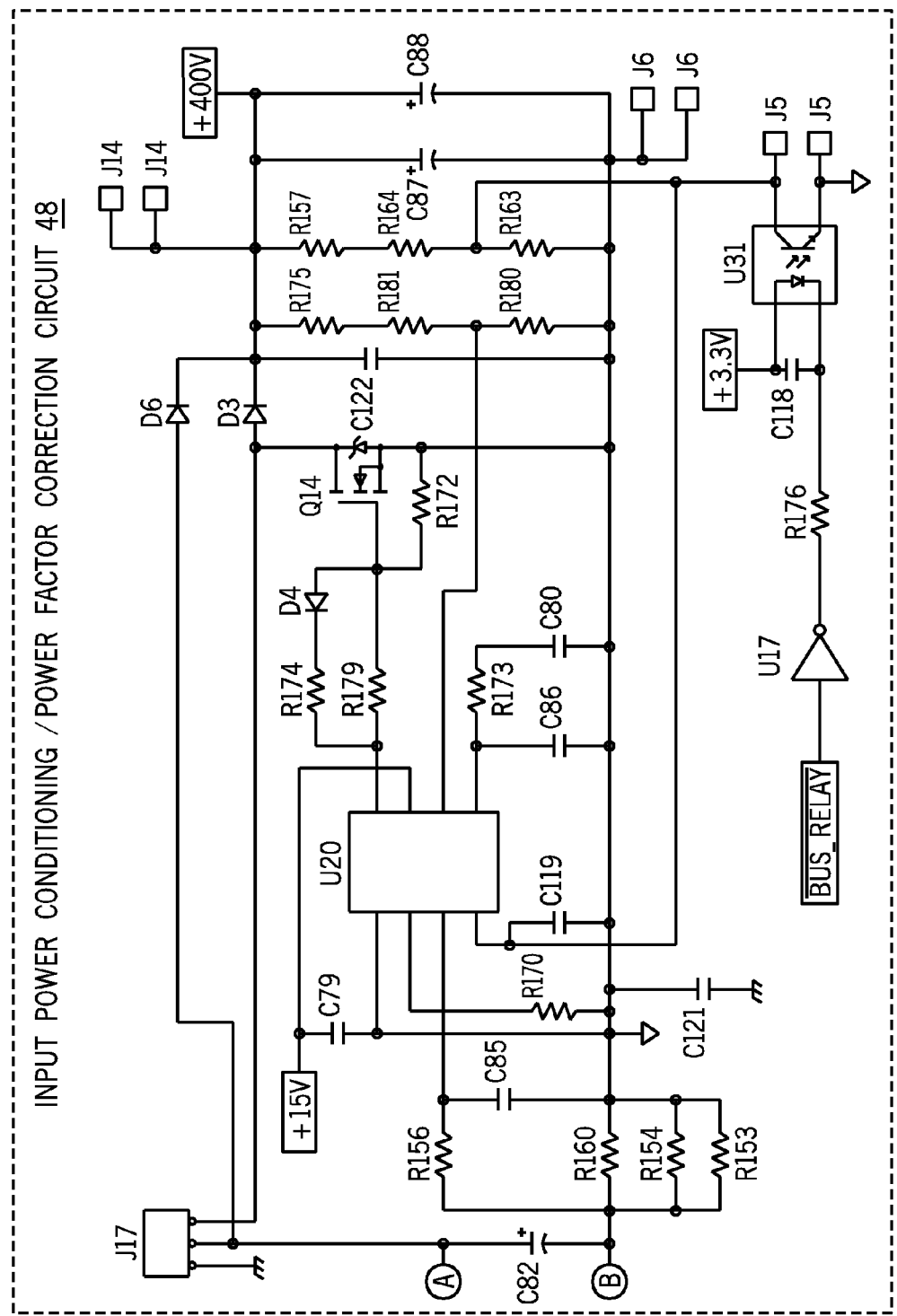

FIGS. 9A and 9B illustrate the input power conditioning and PFC circuit 48. Power (e.g., from a mains power line) enters through the LINE1 connector, then passes through fuse F1. At power-up, in-rush limiting resistor VR1 limits the inrush current to charge the bus capacitors C87 and C88. After logic power is up and the microcontroller U1 waits a predetermined time, the microcontroller U1 sends a signal via a /BUS_RELAY connection (i.e., from pin 35 of the microcontroller U1) to transistor Q19 to turn on the normally open relay K5, which bypasses VR1, reducing power dissipation and stress in VR1. The AC line voltage is then filtered by capacitors C78, C89, C90, and C84, and inductor L3 and transient voltages are limited by MOV (metal oxide varistor) R107. The AC line is then full-wave rectified by diode bridge D5, and capacitor C82, as shown in FIG. 9B, acts as a high frequency bypass for the input to a power factor correction circuit that follows.

The power factor correction circuit includes an off-board inductor connected through J17, transistor Q14, and flyback diodes D3 and D6. The power factor correction circuit also includes output filter capacitors C122, C87, and C88. When transistor Q14 turns on, current from the AC line builds in the off-board inductor. When transistor Q14 turns off, the energy stored in the off-board inductor causes the voltage to rise and the current to discharge through the AC line, the off-board inductor, and diodes D3 and D6 into the output capacitors C122, C87, and C88. This on-off cycle is repeated and the duty cycle can be varied by a PFC control integrated circuit U20 to draw sinusoidal current from the power line at the line frequency.

The PFC control integrated circuit U20 regulates the output voltage to 400 VDC. Current sensing can occur through shunt resistors R153, R154, and RI55, and the output signal can be filtered by resistor R156 and capacitor C85. Capacitor C79 bypasses the 15V power to the PFC control IC U20. Resistor R170 can establish a 100 kHz switching frequency. Resistors R174, R179, and diode D4 can establish the gate rise and fall times for the desired switching speeds of transistor Q14, and resistor R172 is a passive turn-off for transistor Q14 during power-up and power-down. Resistors R175, R181, and R180 form a voltage feedback divider. Resistors R157, R164, and R163 form an overvoltage feedback divider. Optocoupler U31 pulls low on an overvoltage pin of the PFC control IC U20, keeping the PFC control IC U20 disabled whenever the in-rush limiter bypass relay K5 is open. Resistor R173, and capacitors C86 and C80 form a voltage control loop compensation. Capacitor C121 is a noise bypass capacitor from (−) bus to earth.

In some embodiments, the control circuit 38 described above can be modified to be used with a standalone blender or a standalone shaver. For example, in one embodiment, the microcontroller U1 can control a standalone blender motor to overcome high peak torques (e.g., due to ice cubes or large food chunks). The microcontroller U1 can accomplish this by modulating the PFC output (e.g., the effective voltage to the blender motor) to provide temporary bursts of power in order to temporarily overdrive the blender motor. More specifically, the power stages 42, 44 can pull peak currents from the output capacitors of the input power conditioning and PFC circuit 48 in order to provide large instantaneous short bursts of power out of the motor to work through a heavy load condition (e.g., a high torque condition). In one embodiment, the microcontroller U1 can determine if there is a high load requirement (e.g., by sensing a drop in motor speed). By sensing the high load, the microcontroller U1 can anticipate the need to provide a temporary increase or burst in power to the motor in order to either prevent the motor from stalling or to minimize the amount of speed lost during the heavy load condition.

It will be appreciated by those skilled in the art that while the invention has been described above in connection with particular embodiments and examples, the invention is not necessarily so limited, and that numerous other embodiments, examples, uses, modifications and departures from the embodiments, examples and uses are intended to be encompassed by the claims attached hereto. The entire disclosure of each patent and publication cited herein is incorporated by reference, as if each such patent or publication were individually incorporated by reference herein. Various features and advantages of the invention are set forth in the following claims.

The invention claimed is:

1. A machine that at least one of blends liquids and shaves ice, the machine comprising:
 a motor that operates an impeller for one of blending liquid and shaving ice; and
 a control system that controls the motor, the control system configured to be connected to a mains power line and to receive inputs from a switch interface, the control system including
 an integrated power factor correction circuit which receives input power from the mains power line, the integrated power factor correction circuit reducing noise transmitted to the mains power line and providing a boosted, regulated output voltage for use with the control system, and
 a drive circuit connected to the motor, the drive circuit using the regulated output voltage in order to control an effective voltage applied to the motor based on the inputs from the switch interface substantially independent of the voltage and frequency of the input power.

2. The machine of claim 1, wherein the effective voltage applied to the motor is the regulated output voltage pulse-width modulated at a duty cycle.

3. The machine of claim 1, wherein the regulated output voltage is approximately 400 volts, direct current and the effective voltage applied to the motor is approximately 160 volts, direct current.

4. The machine of claim 1, wherein the regulated output voltage is approximately 400 volts, direct current and the effective voltage applied to the motor is approximately 400 volts, direct current.

5. The machine of claim 1, wherein the control system includes a microcontroller which controls the pulse width modulation of the drive circuit.

6. The machine of claim 5, wherein the microcontroller detects and records machine faults.

7. The machine of claim 1, wherein the mains power line is part of a power grid of an internal communication network.

8. The machine of claim 1, wherein the input power received from the mains power line is between approximately 100 volts, alternating current, and approximately 250 volts, alternating current.

9. The machine of claim 1, wherein the switch interface is a pushbutton panel.

10. The machine of claim 1, wherein the control system includes at least one motor overcurrent detection circuit.

11. The machine of claim 1, wherein the control system includes including at least one motor over-temperature detection circuit.

12. The machine of claim 1, wherein the control system includes a drive circuit over-temperature detection circuit.

13. The machine of claim 1, wherein the control system includes an under-voltage detection circuit for monitoring the regulated output voltage.

14. The machine of claim 1, wherein the motor includes a first motor that operates a first impeller for blending liquid and a second motor that operates a second impeller for shaving ice.

15. A blender comprising
 a motor that operates an impeller; and
 a control system that controls the motor and is configured to receive an input power, the control system including
 an integrated power factor correction circuit which receives and regulates the input power, the integrated power factor correction circuit providing a regulated output voltage for use with the motor, and
 a microcontroller in communication with the integrated power factor correction circuit and the motor, the microcontroller capable of detecting a high load condition on the motor, the microcontroller modulating the regulated output voltage from the integrated power factor correction circuit to provide a temporary burst of power in order to overdrive the motor and overcome the high load condition.

16. The blender of claim 15, wherein the microcontroller detects the high load condition by sensing a drop in motor speed.

17. The blender of claim 15, and further comprising a blender motor power stage in communication with the microcontroller and the integrated power factor correction circuit and controlling the motor.

\* \* \* \* \*

UNITED STATES PATENT AND TRADEMARK OFFICE
CERTIFICATE OF CORRECTION

PATENT NO. : 8,550,388 B2  
APPLICATION NO. : 13/048816  
DATED : October 8, 2013  
INVENTOR(S) : Donaldson et al.

Page 1 of 1

It is certified that error appears in the above-identified patent and that said Letters Patent is hereby corrected as shown below:

Title page, after item (65) insert:

--(60) Related U.S. Application Data  
Provisional application No. 61/314,093, filed on Mar. 15, 2010.--

Signed and Sealed this
Twenty-fourth Day of December, 2013

Margaret A. Focarino
*Commissioner for Patents of the United States Patent and Trademark Office*